United States Patent
Bry et al.

(10) Patent No.: US 9,417,325 B1
(45) Date of Patent: Aug. 16, 2016

(54) INTERFACE FOR ACCESSING RADAR DATA

(71) Applicant: Google Inc., Mountain View, CA (US)

(72) Inventors: Adam Bry, San Mateo, CA (US);
Abraham Bachrach, San Francisco, CA (US); Bruno Andre Posokhow, Redwood City, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 14/152,630

(22) Filed: Jan. 10, 2014

(51) Int. Cl.
*G01S 13/93* (2006.01)
*G01S 5/00* (2006.01)
*G08G 5/00* (2006.01)
*G01S 13/00* (2006.01)

(52) U.S. Cl.
CPC ........... *G01S 13/9303* (2013.01); *G01S 5/0009* (2013.01); *G01S 5/0072* (2013.01); *G08G 5/0004* (2013.01)

(58) Field of Classification Search
CPC ..... G01S 13/88; G01S 13/93; G01S 13/9303; G01S 5/0009; G01S 5/0072; G01S 13/74; G01S 13/76; G01S 13/765; G08G 5/0004; G08G 5/0008; G08G 5/0013
USPC ............... 342/27, 28, 29, 36, 52, 58–60, 175, 342/195, 30–32, 450–456, 463–465; 701/300, 301
See application file for complete search history.

(56) References Cited

U.S. PATENT DOCUMENTS

| | | | | |
|---|---|---|---|---|
| 3,582,626 A | * | 6/1971 | Stansbury | G01S 13/9303 701/301 |
| 3,623,090 A | * | 11/1971 | Gilbert | G01S 13/9303 342/29 |
| 3,668,403 A | * | 6/1972 | Meilander | G01S 13/9303 342/36 |
| 3,750,166 A | * | 7/1973 | Dearth | G01S 13/9303 342/30 |
| 4,274,096 A | * | 6/1981 | Dennison | G01S 13/9303 342/456 |
| 5,252,978 A | * | 10/1993 | Priestley | G01S 13/9303 342/29 |
| 5,493,309 A | * | 2/1996 | Bjornholt | G01S 13/9303 701/301 |
| 5,627,546 A | * | 5/1997 | Crow | G01S 13/765 342/32 |
| 6,133,867 A | * | 10/2000 | Eberwine | G01S 5/0072 342/29 |
| 7,529,621 B2 | * | 5/2009 | Reuveni | G01S 5/0072 701/301 |
| 7,747,364 B2 | | 6/2010 | Roy et al. | |
| 8,090,525 B2 | * | 1/2012 | Villiers | G08G 5/0013 342/29 |
| 8,368,584 B2 | | 2/2013 | Askelson et al. | |
| 9,014,880 B2 | * | 4/2015 | Durling | G01S 5/0072 342/29 |
| 2010/0204867 A1 | | 8/2010 | Longstaff | |
| 2010/0283661 A1 | | 11/2010 | Strain et al. | |
| 2012/0209457 A1 | | 8/2012 | Bushnell | |

* cited by examiner

*Primary Examiner* — Bernarr Gregory
(74) *Attorney, Agent, or Firm* — McDonnell Boehnen Hulbert & Berghoff LLP

(57) ABSTRACT

A process is described that includes the generation and transmission of collision avoidance data and/or collision avoidance instructions based on data from 3-D radar scans of an airspace. The transmitted data and/or instructions could facilitate collision avoidance by aerial vehicles operating in the airspace. The transmitted data could be limited to protect the security, privacy, and/or safety of other aerial vehicles, airborne objects, and/or individuals within the airspace. The transmitted data could be limited such that only information pertaining to a region of the airspace proximate to a particular aerial vehicle was transmitted. The transmitted data could be limited such that it included instructions that could be executed by a particular aerial vehicle to avoid collisions and such that the transmitted data did not include location or other data associated with other aerial vehicles or airborne objects in the airspace.

25 Claims, 12 Drawing Sheets

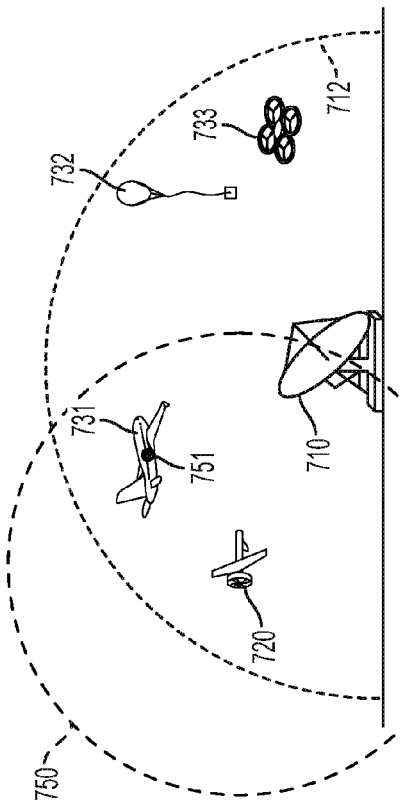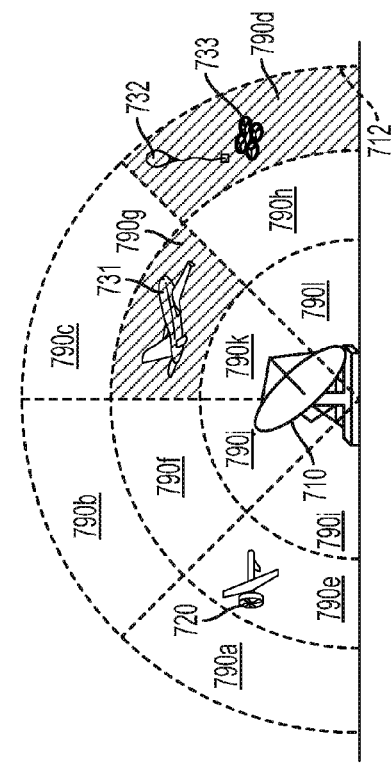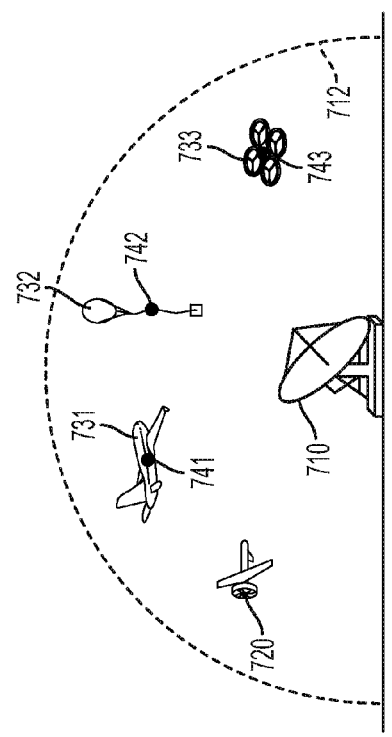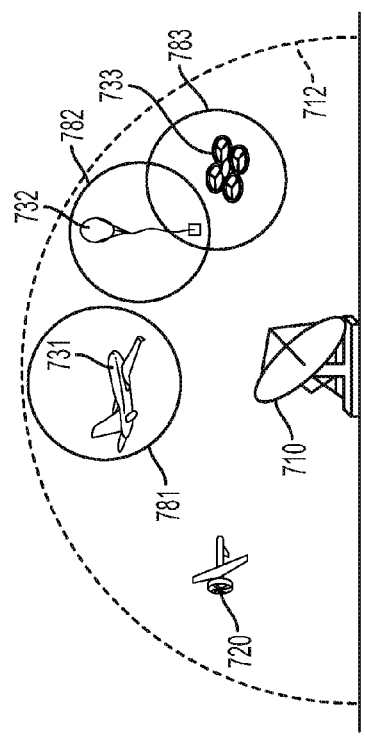

INTERFACE FOR ACCESSING RADAR DATA

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode. The lack of an on-board pilot allows UAVs to perform functions and assume sizes and geometries that would not be possible for an aircraft having a pilot. A UAV can include sensors that provide information about the internal state and/or environment of the UAV, allowing the UAV to avoid obstacles in the environment and perform programmed objectives.

A UAV might operate in a crowded environment, for example the airspace over a city. The airspace over a city could include many obstacles that the UAV must avoid, including commercial and military aircraft, balloons, buildings, antenna masts and guy wires, and other UAVs. In order to operate in such a crowded environment, the UAV must have sufficient information about these or other potential obstacles in order to avoid them.

SUMMARY

Some embodiments of the present disclosure provide a process including: receiving data from 3-D radar scans of an airspace; analyzing the data from the 3-D radar scans to determine collision avoidance data corresponding to airborne objects in the airspace, wherein the determined collision avoidance data comprise determined locations of airborne objects in the airspace; receiving location data associated with a particular aerial vehicle; determining, based on the collision avoidance data and the location data, one or more collision avoidance instructions for the particular aerial vehicle; and transmitting the one or more collision avoidance instructions to facilitate operation of the particular aerial vehicle.

Some embodiments of the present disclosure provide a process including: receiving data from 3-D radar scans of an airspace; analyzing the data from the 3-D radar scans to determine collision avoidance data for the airspace; receiving location data associated with a subscriber entity, wherein the location data indicates a respective location of each of one or more aerial vehicles that are associated with the subscriber entity; filtering the determined collision avoidance data based on the location data associated with the subscriber entity; and transmitting the filtered data to facilitate collision avoidance by the one or more aerial vehicles associated with the subscriber entity.

Some embodiments of the present disclosure provide a system including: a radar system communication interface; an aerial vehicle communication interface; and a controller operably coupled to the radar system communication interface and the aerial vehicle communication interface, wherein the controller is configured to: receive, using the radar system communication interface, data from 3-D radar scans of an airspace; analyze the data from the 3-D radar scans to determine collision avoidance data corresponding to airborne objects in the airspace, wherein the determined collision avoidance data comprise determined locations of airborne objects in the airspace; receive, using the aerial vehicle communication interface, location data associated with a particular aerial vehicle; determine, based on the collision avoidance data and the location data, one or more collision avoidance instructions for the particular aerial vehicle; and transmit, using the aerial vehicle communication interface, the one or more collision avoidance instructions to facilitate operation of the particular aerial vehicle.

Some embodiments of the present disclosure provide a system including: a radar system communication interface; an aerial vehicle communication interface; a controller operably coupled to the radar system communication interface and the aerial vehicle communication interface, wherein the controller is configured to: receive, using the radar system communication interface, data from 3-D radar scans of an airspace; analyze the data from the 3-D radar scans to determine collision avoidance data for the airspace; receive, using the aerial vehicle communication interface, location data associated with a subscriber entity, wherein the location data indicates a respective location of each of one or more aerial vehicles that are associated with the subscriber entity; filter the determined collision avoidance data based on the location data associated with the subscriber entity; and transmit, using the aerial vehicle communication interface, the filtered data to facilitate collision avoidance by the one or more aerial vehicles associated with the subscriber entity.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 7A-7D are illustrations of example collision avoidance data that could be sent to an aerial vehicle in an airspace.

DETAILED DESCRIPTION

Figure 1:
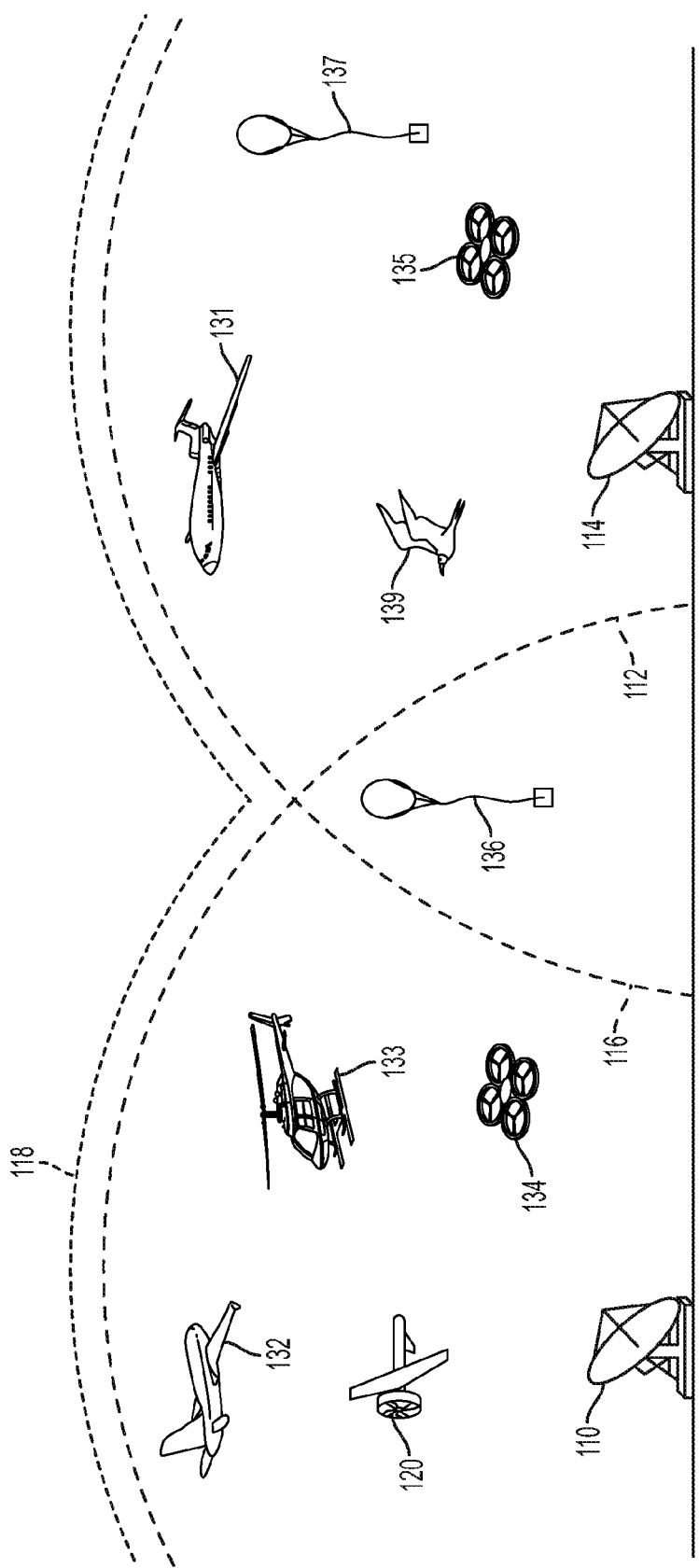
FIG. 1 is a simplified illustration of an example airspace containing airborne obstacles.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

Embodiments described herein may relate to and/or may be implemented in a system where aerial vehicles, and in particular, "unmanned aerial vehicles" (UAVs), are provided with information that helps the aerial vehicles avoid collisions with other objects.

In an illustrative embodiment, a collision avoidance information system may determine airspace scan data for an airspace, and provide all or a part of the determined airspace scan data for use in controlling aerial vehicles in the airspace. The airspace scan data could be determined based on data from one or more radar installations, which are each configured to perform 3-D radar scans of airspace above the installation. Additionally or alternatively, the airspace scan data could be determined based on data from other data sources, including but not limited to light detection and ranging (LIDAR) installations, cameras, magnetometers, sound navigation and ranging (SONAR) systems, or other sensor systems that could be static or moving and that could be located on the ground, in the air, or on a body of water. The airspace scan data could additionally include information on static objects in and/or bordering the airspace, including topographical information about the ground below the airspace and the location, size, geometry, and/or other information about buildings, towers, or other static structures in or below the airspace. In an example embodiment, several radar installations may provide data to a central system that aggregates the data from the radar installations. The central system could then distribute airspace scan data to subscribing entities for use in controlling UAVs controlled by the subscribing entities. The airspace scan data and/or information derived therefrom may be sent from a service provider's system to a subscriber system that controls the UAVs and/or distributes the data to the subscriber's UAVs. Alternatively, airspace scan data and/or information derived therefrom may be sent from a service provider's system directly to UAVs.

In an example embodiment, the airspace scan data, information derived therefrom, and/or other information about the airspace which is provided to a subscriber system and/or to a UAV, may be referred to as "collision-avoidance information." Collision-avoidance information may include location information, trajectory information, other information about some or all of the airborne objects in the airspace, and/or any type of information that could help an aerial vehicle avoid a collision with another airborne object, the surface of the earth below the airspace, and/or structures below the airspace. In some embodiments, collision-avoidance information may indicate a flight maneuver, or include an instruction that could be executed by the particular aerial vehicle.

In a further aspect, the collision avoidance information can be provided via a subscription service. Thus, a subscriber entity may subscribe to the service in order to gain access to collision avoidance information from the collision avoidance information system, such that the subscriber can, e.g., use the collision avoidance information to help control the subscriber's aerial vehicles so as to avoid collisions with other objects.

In some embodiments, a subscriber could pay for access to the obstacle information for a particular environment during a particular time period. For example, a subscriber could pay for access to obstacle information near the city of Los Angeles for a period of a year. The information could be provided to a server or other computing device associated with the subscriber, or could be transmitted directly to a UAV associated with the subscriber.

Further, for security, privacy, and/or other reasons, it could be desired to limit the information provided to the UAV or to the subscriber. For example, only information on obstacles in a small volume near the UAV or in the path of the UAV could be provided. Additionally or alternatively, the information could be degraded; e.g., by reducing the resolution of the location data, or by reporting that a large volume of airspace contained an obstacle, rather than reporting the exact location of the obstacle. The airspace could be divided arbitrarily into sectors and the information provided to the UAV could include a list of occupied and likely-to-be-occupied sectors. The information could lack explicit obstacle location and/or trajectory information entirely. Instead, the information could include a set of 'safe' trajectories, or could indicate that a UAV should perform a certain maneuver or maneuvers to avoid obstacles (e.g., "go down," "bank left"). These services could be referred to as "see and avoid" services.

II. Illustrative Airspace

FIG. 1 illustrates example airborne objects and aerial vehicles in an aerial environment. In particular, FIG. 1 shows a UAV 120, which may be a UAV that is associated with a subscriber entity that subscribes to a subscription service provided by a collision avoidance information system. Further, the illustrated example includes various airborne objects that could pose a collision risk for UAV 120. Specifically, the airborne objects shown in FIG. 1 include commercial jet aircraft 131, 132, a helicopter 133, multirotor UAVs 134, 135, balloons 136, 137, and a bird 139.

FIG. 1 additionally illustrates a first radar installation 110 configured to perform 3-D radar scans of a first region 112 and a second radar installation 114 configured to perform 3-D radar scans of a second region 116. In an example embodiment, the radar installations could be highly accurate, short-range, ground-based radar systems. Such radar systems may perform 360° scans of the airspace within a certain distance of the system; for example, within 10 miles of the radar installation.

Further, in some embodiments, a radar installation 110, 114 may perform scans of the airspace using a solid-state radar system; e.g., a phased array of many radio energy emitters. In particular, the radar installation 110, 114 may use a phased array to create directed beams of radio energy capable of reflecting off of objects in the path of the directed beam. The radar installation 110, 114 may thus detect the reflected beam and determine the location of the objects in the airspace. Further, a radar installation 110, 114 could scan an airspace by, for example, sequentially creating tens of thousands of such directed beams directed in tens of thousands of different directions throughout the airspace.

A collision avoidance information system (not shown) is configured to receive data from 3-D radar scans performed by the radar installations 110, 114 and to generate collision avoidance data for an airspace 118 including the scanned regions 112, 116. The collision avoidance information system is further configured to communicate with subscriber entities and/or aerial vehicles, servers, or other systems associated with subscriber entities (e.g., subscriber UAV 120) in order to facilitate collision avoidance by the aerial vehicles associated with the subscriber entities.

A UAV 120 may be configured in a variety of ways according to an application, and could include one or more airfoils, rotors, and/or other structural elements (described in further detail below). A UAV could operate to perform one or more of a variety of functions, including environmental monitoring, scientific research, search and rescue, disaster management and reconnaissance, medical support and assistance, and/or other applications. A subscriber entity could operate a single UAV or could operate a fleet of UAVs performing the same or different functions. Further, a subscriber entity could operate more UAVs than are provided with collision avoidance data by a collision avoidance information system.

A UAV could be controlled by a controller located in the UAV, a remote controller located at another location and in communication with the UAV, or a combination of controllers located at different locations. In some examples, the UAV could include a controller that was capable of operating the UAV without substantial communication with an external controller. For example, a controller in the UAV could be configured to generate waypoints, determine trajectories, synthesize UAV state information from sensors in the UAV, create control outputs for actuators on the UAV (e.g., throttle levels, elevator angles), and/or other control tasks to achieve a goal or application of the UAV. In some examples, the UAV could be configured to transmit sensor information to and receive control outputs from an external controller. In some examples, a controller on the UAV could be configured to perform some control tasks (e.g., synthesize UAV state information from sensors, create control outputs for actuators on the UAV to maintain level flight) while other tasks are performed by a remote controller in communication with the UAV (e.g., generating waypoints, determining trajectories).

In some examples, certain control tasks could be performed by a controller in the UAV during certain flight conditions and those certain control tasks could be performed by a remote controller during other flight conditions. For example, a controller in the UAV could determine trajectories and create control outputs for actuators on the UAV when the UAV was engaged in steady flight in an empty airspace (i.e., an airspace that does not include other objects proximate to the UAV). When the UAV was operating in an airspace containing other objects proximate to the UAV, a remote controller could determine trajectories and/or create control outputs for actuators on the UAV. The remote controller could be a collision avoidance information system or a server associated with the UAV that had access to collision avoidance information for the airspace proximate to the UAV. Other configurations and locations of controllers relative to a UAV and other distributions of control tasks between controllers of a UAV are anticipated.

The airspace 118 could be any region wherein UAVs or other aerial vehicles could be operated. The airspace 118 could be an airspace in which many UAVs and/or other aerial vehicles (including commercial, manned aircraft) operate. For example, the airspace 118 could be an airspace over a city, a national park, a festival, or some other region of interest. In some examples, the airspace 118 could be a disaster area (e.g., a region affected by flooding, a hurricane, a tornado, or some other severe natural or artificial disaster). Further, an airspace could include regions scanned by fewer (i.e., a single radar installation) or more radar installations than the two example radar stations 110, 114 illustrated in FIG. 1. An airspace could additionally or alternatively be scanned by other systems, including light detection and ranging (LIDAR) installations, cameras, magnetometers, sound navigation and ranging (SONAR) systems, or other sensor systems.

The radar installations 110, 114 or other airspace scanning systems could be permanent installations installed to permanently provide 3-D radar information for the airspace. Alternatively, the radar installations 110, 114 could be temporarily installed to provide 3-D radar information for an area (e.g., trailer- or vehicle-mounted radar installations provided in an area following a natural disaster).

A collision avoidance information system could be any system capable of generating collision avoidance data for an airspace and providing some or all of that information to aerial vehicles and/or to systems controlling aerial vehicles operating near or within the airspace. The collision avoidance information system could be a server or a set of servers in communication with the internet. The collision avoidance information system may receive data generated by one or more radar installations and/or by other systems configured to generate data about the airspace, which collectively perform scans of some or all of the airspace. The collision avoidance system could have access to data describing static objects within or bordering the airspace, including topographical maps of the earth's surface below the airspace and databases containing information on the location, size and/or geometry of structures within the airspace. The collision avoidance information system may then generate collision avoidance data based on information received from the one or more radar installations and/or other systems or data sources.

The collision avoidance information system could be in communication with the one or more radar installations and/or other systems over a direct wired or wireless link, over a network, over the internet, or via some other communication methods. Additionally or alternatively, the collision information system could be part of one or more of the one or more radar installations or other systems. Further, the collision avoidance information system could communicate with aerial vehicles and/or with systems controlling aerial vehicles over Bluetooth, WiFi (e.g., an IEEE 802.11 protocol), Long-Term Evolution (LTE), WiMAX (e.g., an IEEE 802.16 standard), the infrared data association (IrDA) protocol, a radio-frequency ID (RFID) protocol, near-field communication (NFC), and/or other wired or wireless communication protocols. The collision avoidance information system could include mechanisms configured to engage in communication with the airborne vehicles and/or the systems controlling aerial vehicles using the aforementioned methods and/or could communicate with remote systems (via wired or wireless link) configured to communicate with the airborne vehicles.

In examples where the collision avoidance information system has access to 3-D radar scan data from more than one radar installation, the collision avoidance information system could be configured to synthesize data from the more than one radar installation to generate collision avoidance data that is in some way better than collision avoidance data generated from individual radar stations. For example, a collision avoidance information system could use data received from 3-D radar scans performed by the example radar installations 110, 114 in FIG. 1 to generate a more accurate estimate of the location of airborne objects in the region of overlap between respective scanned regions 112, 116 (e.g., balloon 136).

As noted above, a collision avoidance information system could provide collision avoidance data as part of a subscription service, or according to some other model of information access control. In some examples, a subscriber entity could subscribe to a subscription collision avoidance information service in order to gain access to data to facilitate collision avoidance by one or more aerial vehicles associated with the subscriber entity.

In some examples, the collision avoidance information system could provide multiple levels of subscription service; for example, different levels of subscription service could be associated with different data resolutions, data update frequencies, or other features. Different levels of subscription service could be accessed by a subscriber entity by paying fees or by performing other actions. For example, a subscriber entity could access a subscription level having improved collision avoidance data by providing more information about aerial vehicles associated with the subscriber entity (e.g., providing trajectory data, vehicle capabilities, planned flight paths) or by providing proof of compliance with rules and/or standards set by a regulatory body.

Additionally or alternatively, a collision avoidance information system could provide collision avoidance data according to other access control models. For example, the collision avoidance information system could provide collision avoidance data to any entity that provides sufficient identification or other data (e.g., location data associated with an aerial vehicle). As a specific example, the collision avoidance system could provide collision avoidance data to any entity configured to include a component or program enabling communication with the collision avoidance system; e.g., a specialized transponder, an API, a communications protocol, a cryptographic key, or some other device, program, or information. Other examples are also possible.

The collision avoidance data system could be configured to modify radar and/or information received from one or more 3-D radar installations and/or other systems to produce collision avoidance data. Doing so may allow for customized collision avoidance data to be provided to different subscriber entities and/or to different UAVs. For example, based on the received airspace information, the collision avoidance data system may generate estimates of the contents and status of the airspace. For example, the collision avoidance data system may determine locations, trajectories, identities, configurations, and/or other data relating to airborne objects in the airspace.

In a further aspect, the collision avoidance data system may limit, filter, encrypt, or otherwise restrict collision avoidance information, before conveying such information to aerial vehicles and/or subscriber entities. Such processes may help to improve the security, privacy, and/or safety of people, aerial vehicles, and property within and/or below the airspace.

In some examples, collision avoidance information sent to an aerial vehicle or to a subscriber entity associated with the aerial vehicle could include only information pertaining to objects proximate to the location of the aerial vehicle and/or objects in the direction of flight of the aerial vehicle. In some examples, approximate (rather than exact) locations, trajectories, or other information about objects are conveyed to aerial vehicles and/or subscriber entities associated with aerial vehicles. For example, each airborne object in the airspace could be represented by a respective volume in the airspace, such that an aerial vehicle receiving the respective volumes in the airspace could avoid colliding with airborne objects in the airspace by avoiding the respective volumes. However, one could not determine the exact locations of the respective airborne objects in the airspace based on the respective volumes.

In some examples, the collision avoidance information could comprise flight paths, flight instructions or maneuvers (e.g., 'bank left,' roll right, 'pitch downward,' or 'reduce throttle 25%') that could be executed by an aerial vehicle to avoid collision with objects in the airspace. In some examples, the aerial vehicles and/or subscriber entity associated with the aerial vehicles could provide the collision avoidance system with sensor information from the aerial vehicles in real-time or near real-time and the collision avoidance information could include direct commands to control surfaces, motors, or other actuators of the aerial vehicles. In those examples, the collision avoidance system could essentially 'take control' of the aerial vehicles in order to allow the aerial vehicles to avoid collisions with objects in the airspace. This type of collision avoidance information could be provided in order to reduce the cost and/or complexity of the aerial vehicles, as they could avoid implementing complicated collision avoidance control algorithms whose function(s) could be provided by the collision avoidance information system.

In some examples, the collision avoidance information system could improve the collision avoidance data by using information provided by aerial vehicles and/or subscriber entities associated with aerial vehicles that receive collision avoidance information generated by the collision avoidance information system. For example, aerial vehicles or subscriber entities associated with aerial vehicles could be required to provide information about the aerial vehicles including location, trajectory, configuration, identity, or other information in order to receive collision avoidance information. The collision avoidance information system could then use the location or other information to improve the methods or calculations the collision avoidance information system uses to generate the collision avoidance data.

For example, the collision avoidance information system could use methods to generate airborne object locations and trajectories based on data about the airspace received from 3-D radar scans of the airspace (e.g., scanning beam directions and timings and corresponding respective reflected radio frequency waveforms, etc.). The collision avoidance information system could then compare a set of generated airborne object locations, trajectories, and/or other object data to aerial vehicle location, trajectory, or other data received from aerial vehicle and/or a subscriber entity associated with an aerial vehicle. The collision avoidance information system could determine that the aerial vehicle corresponded to an airborne object in the airspace. The collision avoidance information system could assume that the received location or other data was more accurate than the corresponding generated location or other data and adjust the method used to generate the generated location or other data such that the method was able to generate more accurate location or other collision avoidance data from the 3-D radar scan data in the future.

Further, if a collision avoidance information system received location or other data from an aerial vehicle and/or an associated subscriber entity that did not substantially match a corresponding generated location or other data for an airborne object, the aerial vehicle and/or corresponding subscriber entity could be barred from receiving future collision avoidance data or could experience some other change in a received service or a subscription status.

Note that, while the embodiments described herein describe aerial vehicles that do not include human operators and systems interacting with such aerial vehicles, the embodiments described herein can be employed with piloted aerial vehicles (i.e., aerial vehicles that include human operators). In some examples, locations, trajectories, and/or other information about objects proximate to a piloted aerial vehicle could be determined by a collision avoidance system and transmitted (unaltered, or filtered as described herein) to a system of the piloted aerial vehicle and/or to the operator of the aerial vehicle. Additionally or alternatively, trajectories, flight maneuvers, and/or other collision avoidance instructions could be sent by a collision avoidance information system to a piloted aerial vehicle. Other embodiments of a collision avoidance information system providing collision avoidance data directly or indirectly to a human operator of an aerial vehicle or to a system of an aerial vehicle are anticipated.

III. Illustrative Unmanned Vehicles

The term "unmanned aerial vehicle," as used in this disclosure, refers to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 2:
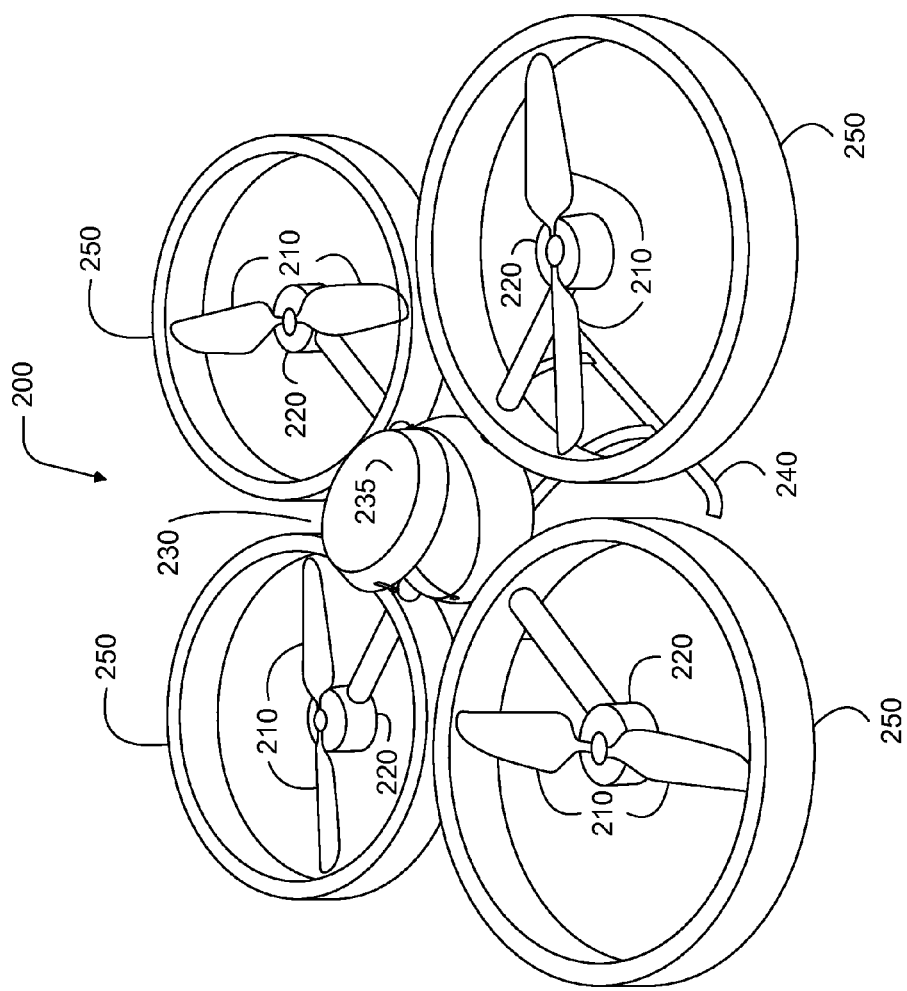
FIGS. 2, 3, 4A, and 4B are simplified illustrations of unmanned aerial vehicles, according to example embodiments.

FIG. 2 is a simplified illustration of a UAV, according to an example embodiment. In particular, FIG. 2 shows an example of a rotorcraft 200 that is commonly referred to as a multicopter. Multicopter 200 may also be referred to as a quadcopter, as it includes four rotors 210. It should be understood that example embodiments may involve rotorcraft with more or less rotors than multicopter 200. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 200 in greater detail, the four rotors 210 provide propulsion and maneuverability for the multicopter 200. More specifically, each rotor 210 includes blades that are attached to a motor 220. Configured as such the rotors may allow the multicopter 200 to take off and land vertically, to maneuver in any direction, and/or to hover. Furthermore, the pitch of the blades may be adjusted as a group and/or differentially, and may allow a multicopter 210 to perform three-dimensional aerial maneuvers such as an upside-down hover, a continuous tail-down "tic-toc" loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 200. Blade-pitch adjustment may be particularly useful for rotorcraft with substantial inertia in the rotors and/or drive train, but is not limited to such rotorcraft Additionally or alternatively, multicopter 200 may propel and maneuver itself by adjusting the rotation rate of the motors, collectively or differentially. This technique may be particularly useful for small electric rotorcraft with low inertia in the rotors and/or drive train, but is not limited to such rotorcraft.

Multicopter 200 also includes a central enclosure 230 with a hinged lid 235. The central enclosure may contain, e.g., control electronics such as an inertial measurement unit (IMU) and/or an electronic speed controller, a GPS receiver, batteries, other sensors, communications devices, and/or a payload, among other possibilities.

The illustrative multicopter 200 also includes landing gear 240 to assist with controlled take-offs and landings. In other embodiments, multicopters and other types of UAVs without landing gear are also possible.

In a further aspect, multicopter 200 includes rotor protectors 250. Such rotor protectors 250 can serve multiple purposes, such as protecting the rotors 210 from damage if the multicopter 200 strays too close to an object, protecting the multicopter 200 structure from damage, and protecting nearby objects from being damaged by the rotors 210. It should be understood that in other embodiments, multicopters and other types of UAVs without rotor protectors are also possible. Further, rotor protectors of different shapes, sizes, and function are possible, without departing from the scope of the invention.

A multicopter 200 may control the direction and/or speed of its movement by controlling its pitch, roll, yaw, and/or altitude. To do so, multicopter 200 may increase or decrease the speeds at which the rotors 210 spin. For example, by maintaining a constant speed of three rotors 210 and decreasing the speed of a fourth rotor, the multicopter 200 can roll right, roll left, pitch forward, or pitch backward, depending upon which motor has its speed decreased. Specifically, the multicopter may roll in the direction of the motor with the decreased speed. As another example, increasing or decreasing the speed of all rotors 210 simultaneously can result in the multicopter 200 increasing or decreasing its altitude, respectively. As yet another example, increasing or decreasing the speed of rotors 210 that are turning in the same direction can result in the multicopter 200 performing a yaw-left or yaw-right movement. These are but a few examples of the different types of movement that can be accomplished by independently or collectively adjusting the RPM and/or the direction that rotors 210 are spinning.

Figure 3:
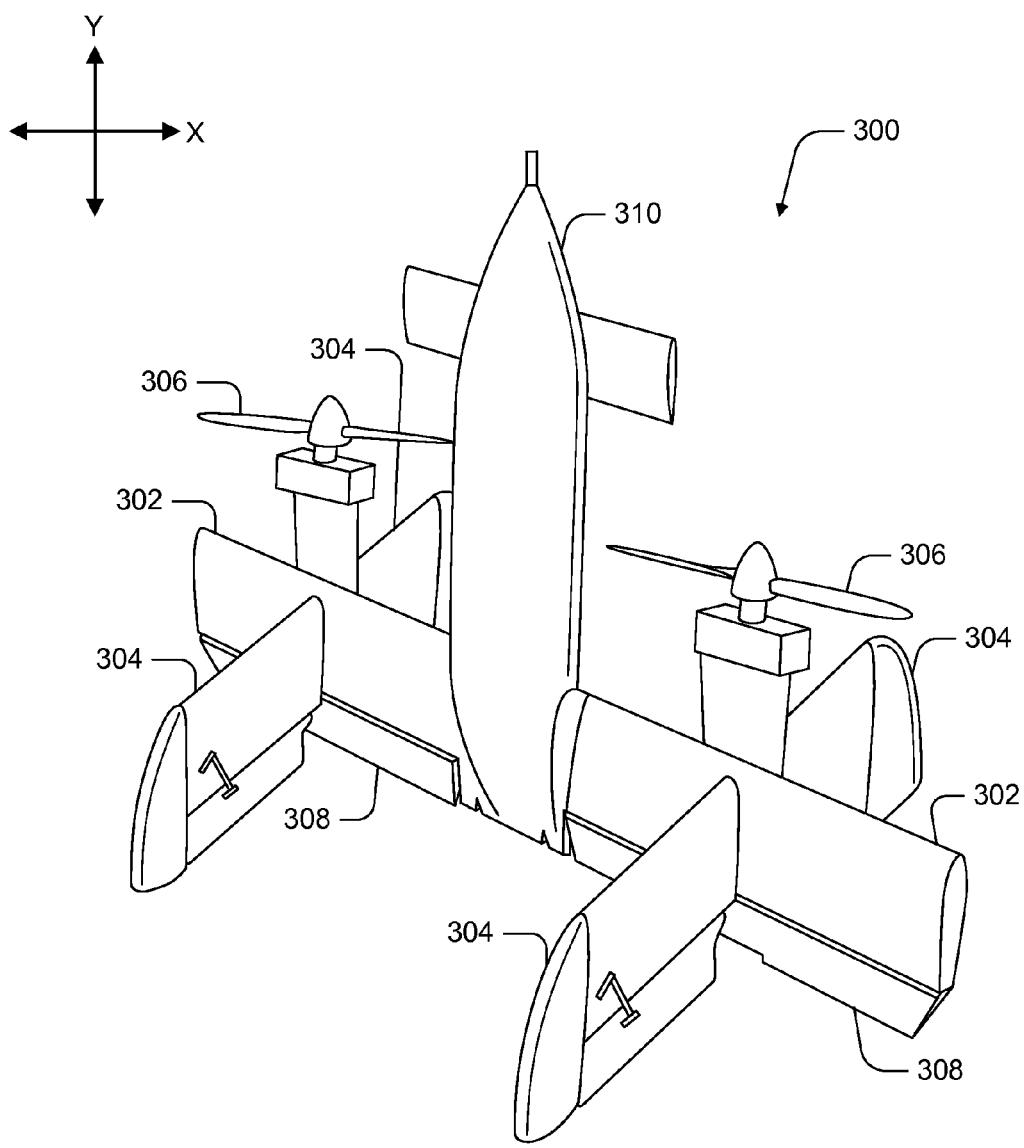

FIG. 3 is a simplified illustration of a UAV, according to an example embodiment. In particular, FIG. 3 shows an example of a tail-sitter UAV 300. In the illustrated example, the tail-sitter UAV 300 has fixed wings 302 to provide lift and allow the UAV to glide horizontally (e.g., along the x-axis, in a position that is approximately perpendicular to the position shown in FIG. 3). However, the fixed wings 302 also allow the tail-sitter UAV 300 take off and land vertically on its own.

For example, at a launch site, tail-sitter UAV 300 may be positioned vertically (as shown) with fins 304 and/or wings 302 resting on the ground and stabilizing the UAV in the vertical position. The tail-sitter UAV 300 may then take off by operating propellers 306 to generate the upward thrust (e.g., a thrust that is generally along the y-axis). Once at a suitable altitude, the tail-sitter UAV 200 may use its flaps 308 to reorient itself in a horizontal position, such that the fuselage 310 is closer to being aligned with the x-axis than the y-axis. Positioned horizontally, the propellers 306 may provide forward thrust so that the tail-sitter UAV 300 can fly in a similar manner as a typical airplane.

Variations on the illustrated tail-sitter UAV 300 are possible. For instance, tail-sitters UAVs with more or fewer propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 300 are also possible.

As noted above, some embodiments may involve other types of UAVs, in addition or in the alternative to multicopters. For instance, FIGS. 4A and 4B are simplified illustrations of other types of UAVs, according to example embodiments.

Figure 4A:
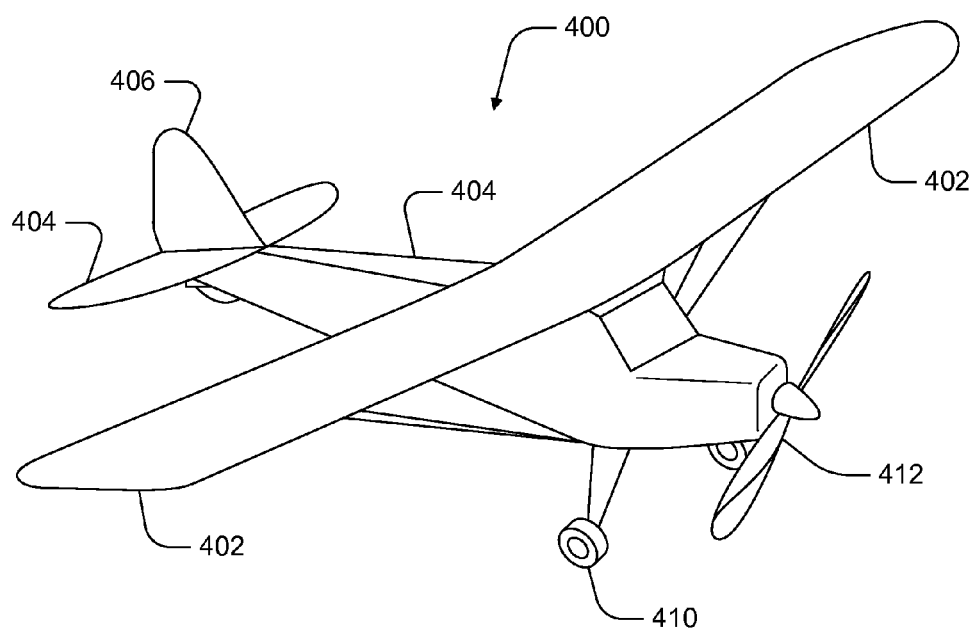

In particular, FIG. 4A shows an example of a fixed-wing aircraft 400, which may also be referred to as an airplane, an aeroplane, or simply a plane. A fixed-wing aircraft 300, as the name implies, has stationary wings 402 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 4A depicts some common structures used in a fixed-wing aircraft 400. In particular, fixed-wing aircraft 400 includes a fuselage 404, two horizontal wings 402 with an airfoil-shaped cross section to produce an aerodynamic force, a vertical stabilizer 406 (or fin) to stabilize the plane's yaw (turn left or right), a horizontal stabilizer 408 (also referred to as an elevator or tailplane) to stabilize pitch (tilt up or down), landing gear 410, and a propulsion unit 412, which can include a motor, shaft, and propeller.

Figure 4B:
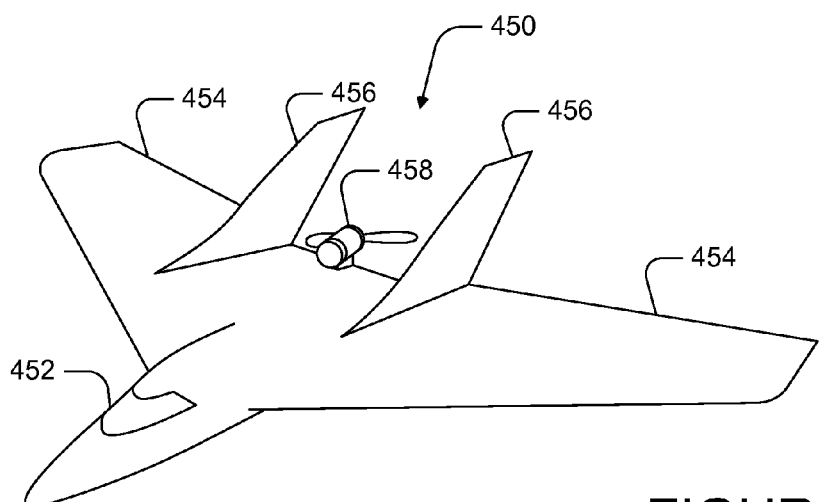

FIG. 4B shows an example of an aircraft 450 with a propeller in a pusher configuration. The term "pusher" refers to the fact that the propulsion unit 458 is mounted at the back of the aircraft and "pushes" the vehicle forward, in contrast to the propulsion unit being mounted at the front of the aircraft. Similar to the description provided for FIG. 4A, FIG. 4B depicts common structures used in the pusher plane: a fuselage 452, two horizontal wings 454, vertical stabilizers 456, and a propulsion unit 458, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft is positioned in the launch system on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by imparting an initial thrust to the UAV sufficient to allow the UAV to initiate flight. A launch system of this type may launch a UAV quickly and/or may launch a UAV far toward the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

Figure 5:
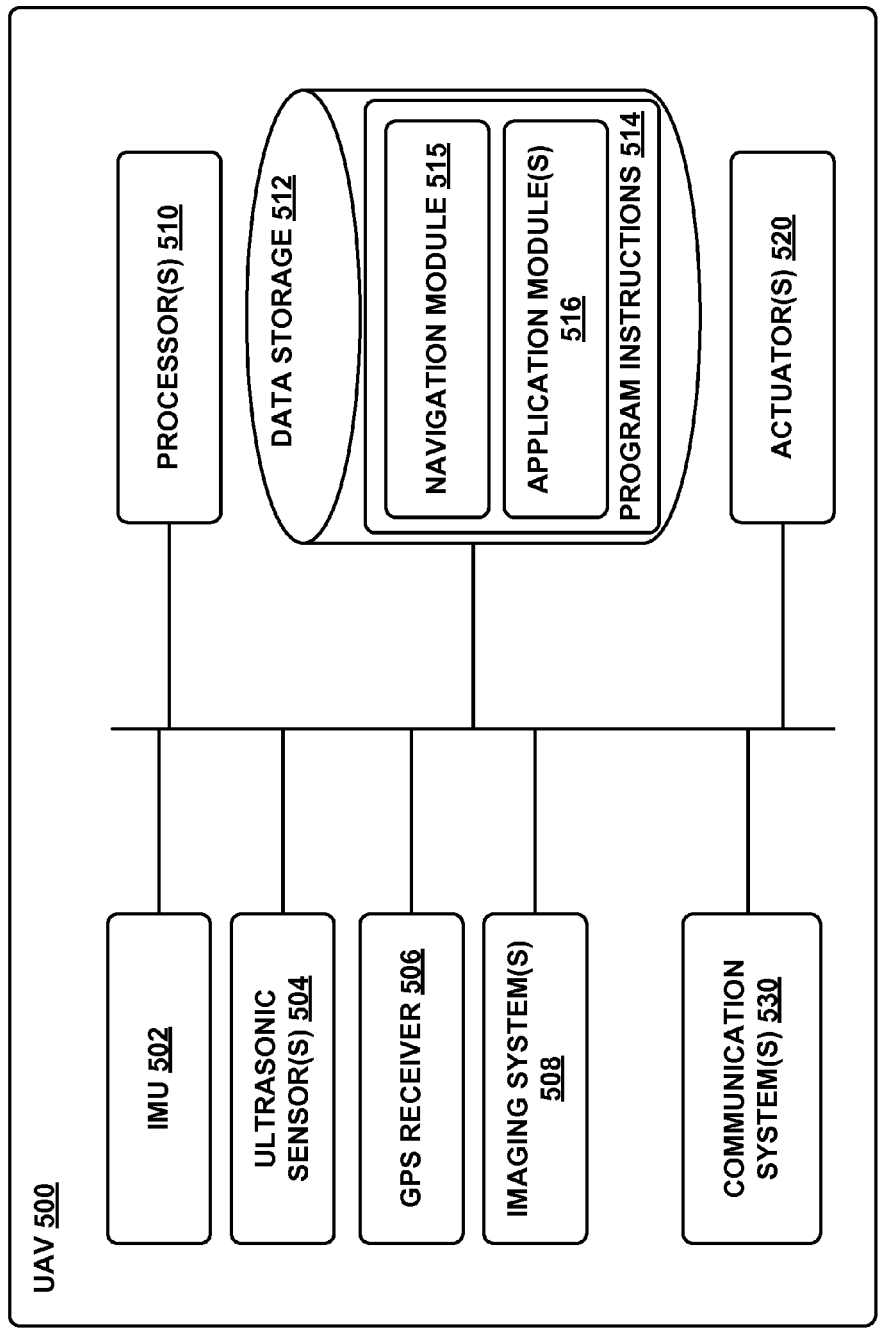
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 200, 400, and 450 shown in FIGS. 2, 3, 4A, and 4B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS receiver 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, electronic, organic, or other memory or disc storage, which can be integrated in whole or in part with at least one of the one or more processors 510. In some embodiments, the data storage 512 can be implemented using a single physical device (e.g., one optical, magnetic, electronic, organic, or other memory or disc storage unit), while in other embodiments, the data storage 512 can be implemented using two or more physical devices.

As noted, the data storage 512 can include computer-readable program instructions 514 and perhaps additional data, such as diagnostic data of the UAV, stored sensor data, or other information. As such, the data storage 514 may include program instructions to perform or facilitate some or all of the UAV functionality described herein. For instance, in the illustrated embodiment, program instructions 514 include a navigation module 515 and one or more application modules 516.

A. Sensors

In an illustrative embodiment, IMU 502 may include both an accelerometer and a gyroscope, which may be used together to determine the orientation of the UAV 500. In particular, the accelerometer could be used to measure the orientation of the vehicle with respect to the earth's gravity field, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU).

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as three-dimensional coordinates of the UAV 500 relative to the Earth. Such GPS data may be utilized by the UAV 500 for various functions. For example, when the UAV is operating in an autonomous or semi-autonomous mode, the UAV could use the GPS data to move along a commanded flightpath or to navigate to a commanded waypoint or goal. In another example, the UAV could record the GPS data to provide location context data to other data recorded by the UAV, for example environmental or magnetometer sensor readings. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system(s) 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling actuator(s) 520 of the UAV that affect flight (e.g., rotors 210 of UAV 200).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person in need of medical support (e.g., within reach of the person), so as to properly provide medical support to the person. To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person in need using waypoints that are pre-determined based on GPS coordinates provided by a remote device at the scene of the medical situation. The UAV may then switch to mode in which it utilizes a localization process to locate and travel to a specific location of the person in need. For example, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person once a UAV 500 has navigated to the general area of the person. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of the person, the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific location or delivering its medical-support items to the medical situation; for example, by displaying a visual message in a graphic display, playing an audio message or tone through speakers, flashing a light, or performing a combination of such functions. Such visual or audio message might indicate that assistance is needed in delivering the UAV 500 to the person in need, and might provide information to assist the passer-by in delivering the UAV 500 to the person, such a description of the person, the person's name, and/or a description of the person's specific location, among other possibilities. This implementation can be useful in a scenario in which the UAV is unable to use sensory functions or another location-determination technique to determine the specific location of the person.

As an additional example, once a UAV 500 arrives at the general area of a person, the UAV may utilize a beacon from the remote device (e.g., the mobile phone of a person who called for medical support) to locate the person. Such a beacon may take various forms. As an example, consider the scenario where a remote device, such as the mobile phone of a person in need or a bystander, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its actuator(s) 520 (e.g., rotors 210 of UAV 200) in order to effectuate such movements. The remote computing system may then communicate such adjustments to the UAV so it can move in the determined manner.

C. Communication Systems

In a further aspect, UAV 500 includes one or more communication systems 530. The communications systems 530 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), the infrared data association (IrDA) protocol, a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 530 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

The communication systems 530 could be used to enable remote control of the UAV 500, for example the fly-by-wire control described above. In another example, the communication systems 530 could be used to transmit navigational instructions, waypoints, flightplans, objectives, or other command information to the UAV 500. The communication systems 530 could also enable transmission of other information to the UAV 500; for example, radar data, maps, environmental conditions, navigational hazards, updates to the program instructions 514, or other data relevant to the function of the UAV 500. The communication systems 530 could also be used to transmit information from the UAV 500, for example, telemetry data from the UAV 500, environmental or other data gathered sensors on the UAV 500, data on the status of objectives sent to the UAV 500, or other information according to an application.

D. Power Systems

In a further aspect, UAV 500 may include power system(s) (not shown). A power system may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery. In some examples, the power system(s) could include a solar cell for capturing energy from the sun to partially power the UAV 500. In some examples, the power system(s) could include an optical power receiver configured such that the UAV 500 could be wholly or partially powered by energy transmitted to the UAV 500 in a beam of light (e.g., a visible or invisible laser) and received by the optical power receiver.

E. Application-Specific Functionality

As noted above, UAV 500 may include one or more application modules 516. The one or more application modules 516 include software that may enable the UAV 500 (in combination with application firmware and/or application hardware disposed in the UAV 500 (not shown)) to perform some function or application. For example, application module(s) 516 could be provided (in addition to application hardware (not shown)) to enable the UAV 500 to help to provide or assist in the provision of the medical-support functionality described herein.

Configured as such, a UAV 500 may provide medical support in various ways. For instance, a UAV 500 may have stored information that can be provided to a person or persons at the target location, in order to assist the person or persons in providing medical care. For example, a UAV may include a video or audio file with instructions for providing medical support, which the UAV can play out to a person at the target location. As another example, a UAV may include an interactive program to assist a person at the target location in providing medical support. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, an application module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

Further, in order to provide medical support at a remote location, a UAV 500 may be configured to transport items to the scene of a medical situation. Such items may aid in diagnosing and/or treating a person who needs medical assistance, or may serve other purposes. Such items may include, as examples: (a) medicines, (b) diagnostic devices, such as a pulse oximeter, blood pressure sensor, or ECG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. Additionally or alternatively, an item may be integrated with one or more batteries in the power system(s) for power.

A UAV 500 may employ various systems and configurations in order to transport items to the scene of a medical situation. For example, as shown in FIG. 2, a UAV 200 can include a compartment 235, in which an item or items may be transported. As another example, the UAV 500 can include a pick-and-place mechanism, which can pick up and hold the item while the UAV 500 is in flight, and then release the item during or after the UAV's descent. As yet another example, a UAV 500 could include an air-bag drop system, a parachute drop system, and/or a winch system that is operable from high above a medical situation to drop or lower an item or items to the scene of the medical situation. Other examples are also possible.

In some implementations, a given UAV 500 may include a "package" designed for a particular application and/or medical situation (or possibly for a particular set of medical situations). A package may include one or more items for medical support in the particular medical situation, and/or one or more application modules 516 and related hardware disposed in the UAV 50 that are designed to provide medical support in the particular medical situation. In some cases, a UAV 500 may include a package that is designed for a particular medical situation such as choking, cardiac arrest, shock, asthma, drowning, etc.

In other cases, a UAV 500 may include a package that is designed for a number of different medical situations, which may be associated in some way. For example, a dive-accident package may be designed to provide or assist in provision of care in various medical situations that are often associated with a scuba diving accident, such as drowning and/or decompression sickness. Such a dive-accident package might include a flotation device, an oxygen-therapy system, a system for delivering visual and/or audible medical care instructions (e.g., instructions for performing CPR), and/or a signaling device, among other possibilities. A UAV 500 that is configured with such a dive-accident package may be referred to herein as a "dive-rescue" UAV. Such a dive-rescue UAV may be deployed to a diver on the surface of the water, who has just had an accident while scuba diving, with the hope that the UAV can reach the diver and deliver medical treatment sooner than would otherwise be possible.

For instance, provided with the above dive-accident package, the UAV 500 may drop a flotation device to help the diver stay afloat until the diver can be reached by rescuers. In addition, the UAV may include a signaling device, which can be automatically turned on when the UAV locates the diver. Doing so may help a rescue boat locate a diver more quickly. Further, once the diver has been rescued, the UAV may display visual instructions and/or play back auditory instructions for CPR, which may help to revive a drowning victim. Such instructions may be particularly useful in the case where the diver is rescued by non-medical professionals; if the diver is rescued by a passing fishing boat, for example.

Further, when the UAV arrives at the scene of a dive accident or, more likely, once the diver has been moved to a rescue boat, the UAV could provide an oxygen-therapy system, and possibly instructions for use thereof, in order to treat possible decompression sickness. Since a rescue boat might not have oxygen-therapy system, and immediate administration of pure oxygen has been shown to increase the probability of recovering from decompression sickness, such functionality of a UAV could improve treatment for a diver suffering from decompression sickness.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

As a specific example, a multicopter might include components of an AED that is built into its body, as well as retractable electrode pads for administering a shock to a person who is experiencing a cardiac event or arrest. When the multicopter arrives at the scene of cardiac arrest, the multicopter may land, disable its rotors, and enter a mode where it functions as an AED. Specifically, after landing, the multicopter may release its retractable electrode pads and provide instructions so that a bystander, who might be layperson, could use the electrode pads to administer care to the person with a cardiac arrest. Such instructions may be provided, for example, by displaying text and/or video on a graphic display that is built in to the body of the multicopter, and/or by playing back audio instructions. The multicopter could also include a wireless communication interface via which a bystander could communicate with a live remote operator (e.g., a medical professional at a remote location), in order to receive instructions for using the AED.

Many other examples and variations on the above examples of UAVs with integrated medical-support systems and devices are also possible. For instance, a medical device may be integrated into the structure of a UAV itself when doing so reduces weight, improves aerodynamics, and/or simplifies the use of the device by a person at the scene of the medical situation. Further, those skilled in the art will appreciate that a medical-support system or device may be integrated in the structure of a UAV in other situations and for other reasons.

In some applications, a UAV 500 may be dispatched to the scene of a medical situation to provide early intelligence to medical personnel. In particular, a UAV 500 may be dispatched because it is expected to reach the location of a medical situation more rapidly than medical personnel are able to. In this scenario, the UAV 500 may arrive at the scene and provide early intelligence by communicating information and providing situational awareness to medical personnel. For example, a UAV 500 may use its imaging system(s) 508 to capture video and/or still images at the scene of the medical situation, which the UAV 500 may communicate to medical and/or emergency personnel. As another example, UAV 500 could administer preliminary tests to a person in need, or request that a bystander administer certain preliminary diagnostic tests and/or provide certain information. UAV 500 may then send such test results and/or such information provided by a bystander to medical and/or emergency personnel. A UAV 500 may provide other types of early-intelligence information as well.

By providing early intelligence to medical and/or emergency personnel, a UAV 500 may help the medical and/or emergency personnel to prepare to provide care, such that more effective care can be provided once the personnel arrive at the scene. For instance, a UAV 500 could send video, test results, and/or bystander-provided information to medical personnel while they are travelling in an ambulance on their way to the scene, to firemen or other personnel while they are in a fire truck on their way to the scene, and/or to police they are in a law-enforcement vehicle on their way to the scene, among other possibilities.

It should be understood that the examples of applications of a UAV that are provided herein are not intended to be limited. A UAV may be configured to provide other types of functionality without departing from the scope of the invention.

IV. Illustrative Collision Avoidance Information

Figure 6A:
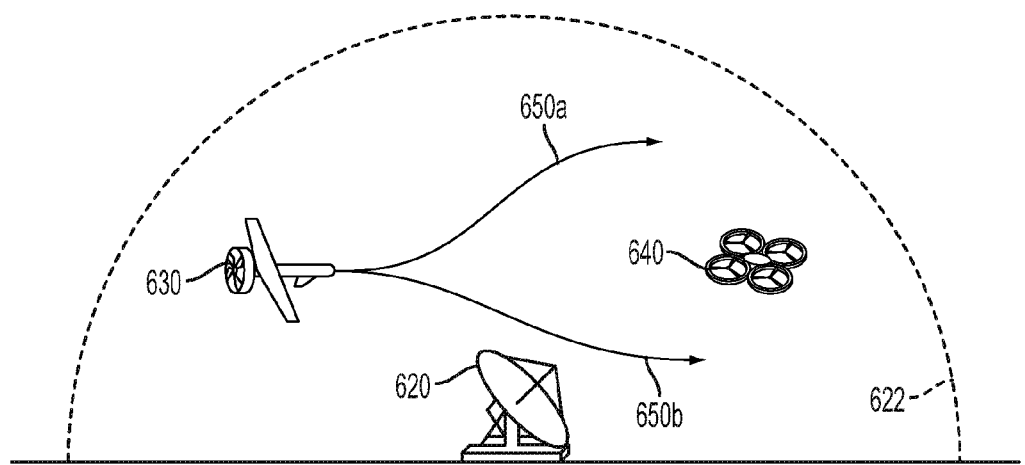
FIGS. 6A and 6B are illustrations of example collision avoidance instructions that could be sent to an aerial vehicle in an airspace.

FIG. 6A illustrates an example airspace 622 being scanned by a 3-D radar installation 620 in communication with a collision avoidance information system (not shown). FIG. 6A also shows an example UAV 630 configured to communicate with the collision avoidance information system and an airborne object 640 that the UAV 630 could collide with.

The UAV 630 could request collision avoidance data from the collision avoidance information system. Alternatively or additionally, the collision avoidance information system could determine that the UAV 630 was at risk of a collision. In response to a collision avoidance data request, a collision risk determination, and/or some other causative event, the collision avoidance information system could send a description of one or more safe paths to the UAV 630. The described one or more paths could be paths through the airspace such that the UAV 630 could follow one of the one or more safe paths to avoid colliding with objects or structures in the airspace including airborne object 640.

Path 650*a* is an example of a safe path through the airspace that could be sent to the UAV 630 from the collision avoidance information system. Path 650*a* could be followed by UAV 630 such that UAV 630 could move to the left around the airborne object 640 and avoid colliding with airborne object 640. Path 650*b* is another example of a safe path through the airspace that could be sent to the UAV 630 from the collision avoidance information system. Path 650*b* could be followed by UAV 630 such that UAV 630 could move below the airborne object 640 and avoid colliding with airborne object 640. Other safe paths are possible. Paths 650*a* and 650*b*, UAV 630, airborne object 640, radar installation 620 and airspace 622 are meant as non-limiting illustrative examples only. More or fewer UAVs, airborne objects, ground-based structures, radar installations, sent described safe paths, and other elements are anticipated. Additionally or alternatively, the airspace 622 could be scanned by light detection and ranging (LIDAR) installations, cameras, magnetometers, sound navigation and ranging (SONAR) systems, or other sensor systems and the data generated by these systems could be used by a collision avoidance information system to generate safe paths through the airspace.

Figure 6B:
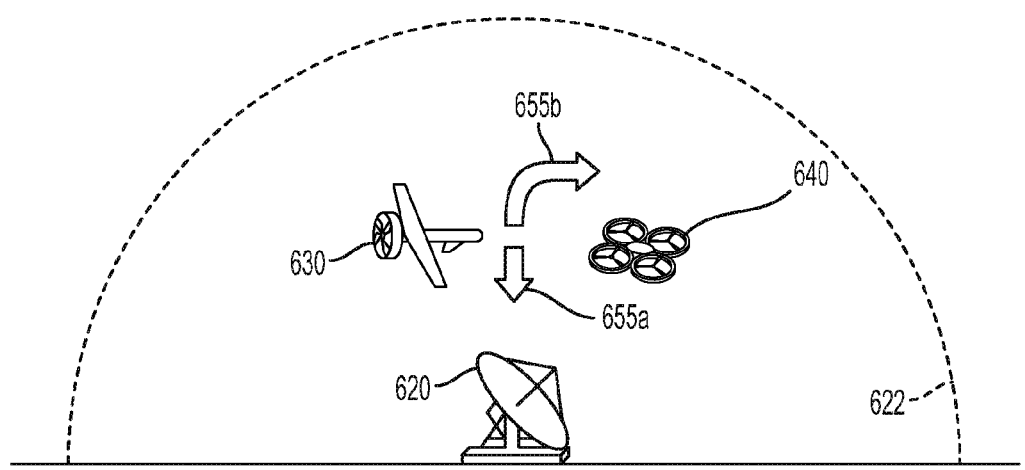

FIG. 6B illustrates an example airspace 662 being scanned by a 3-D radar installation 660 in communication with a collision avoidance information system (not shown). FIG. 6B also shows an example UAV 635 configured to communicate with the collision avoidance information system and an airborne object 645 that the UAV 635 could collide with.

The UAV 635 could request collision avoidance data from the collision avoidance information system. Alternatively or additionally, the collision avoidance information system could determine that the UAV 635 was at risk of a collision. In response to a collision avoidance data request, a collision risk determination, and/or some other causative event, the collision avoidance information system could send one or more flight instructions to the UAV 635. The one or more flight instructions could be flight instructions such that the UAV 635 could execute one of the one or more flight instructions to avoid colliding with objects or structures in the airspace including airborne object 645.

Flight instruction 655*a* is an example of a pitch downward instruction that could be sent to the UAV 635 from the collision avoidance information system. Flight instruction 655*a* could be executed by UAV 635 such that UAV 635 could maneuver below the airborne object 645 and avoid colliding with airborne object 645. Flight instruction 655*b* is another example of a flight instruction (roll left) that could be sent to the UAV 635 from the collision avoidance information system. Flight instruction 655*b* could be executed by UAV 635 such that UAV 635 could maneuver around the airborne object 645 and avoid colliding with airborne object 645.

Other flight instructions, including but not limited to rolls, pitches, yaws, throttle adjustments, elevator adjustments, and trim adjustments, are possible. Further, flight instructions could specify the duration and/or amplitude to which the instruction should be executed by the UAV 635. For example, collision avoidance data sent to the UAV 635 could include an instruction to assume a forward pitch of 15 degrees for 30 seconds. Flight instructions 655*a* and 655*b*, UAV 635, airborne object 645, radar installation 660 and airspace 662 are meant as non-limiting illustrative examples only. More or fewer UAVs, airborne objects, ground-based structures, radar installations, sent flight instructions, and other elements are anticipated. Additionally or alternatively, the airspace 622 could be scanned by light detection and ranging (LIDAR) installations, cameras, magnetometers, sound navigation and ranging (SONAR) systems, or other sensor systems and the data generated by these systems could be used by a collision avoidance information system to generate flight instructions.

Safe paths and/or flight instructions sent to a UAV from a collision avoidance information system could be based a variety of factors. For example, the safe paths and/or flight instructions could be based on the location and trajectory of the UAV. In some examples, the safe paths and/or flight instructions could be based on information about the configuration and/or capabilities of the UAV. For example, the UAV could have a limited thrust, a limited heading change rate, a damaged component or components, or some other constraint, and the safe paths and/or flight instructions could be based on that information such that the UAV was able to follow the safe paths and/or execute the flight instructions. For example, a small UAV could be at risk of damage due to collision with small obstacles in the airspace, like birds, such that the safe paths and/or flight instructions could be based on information about the location of small obstacles. Conversely, a larger UAV could not be at risk of damage due to collision with small obstacles in the airspace, such that the safe paths and/or flight instructions could not be based on information about the location of small obstacles.

The safe paths and/or flight instructions could be based on a destination or other objective of the UAV such that the safe paths and/or flight instructions could be determined to minimize deviation from the destination or other objective. Further, safe paths and/or flight instructions could be based on knowledge of planned paths or other predicted future behaviors and/or locations of objects or structures in the airspace. For example, other UAVs in communication with the collision avoidance information system, commercial planes that have reported location, trajectory, or other data through AIS or some other communications system, topographical map databases, or other data sources could be used.

Moreover, collision avoidance data sent to a UAV by a collision avoidance information system could include more extensive instructions. For example, the UAV could send the collision avoidance information system information on the state, configuration, objectives, capabilities, and/or other information about the UAV (e.g., speed, orientation, UAV model and/or type, throttle(s), location, fuel reserve, destination) repeatedly over time. In response, the collision avoidance information system could repeatedly over time send collision avoidance data to the UAV that included commands to be actuated by the UAV. In this way the collision avoidance information system could be said to be directly operating the UAV.

FIGS. 7A-7D illustrate an example airspace 712 being scanned by a 3-D radar installation 710 in communication with a collision avoidance information system (not shown). FIGS. 7A-7D also show an example UAV 720 configured to communicate with the collision avoidance information system and airborne objects 731, 732, 733 that the UAV 710 could collide with.

The UAV 720 could request collision avoidance data from the collision avoidance information system. Alternatively or additionally, the collision avoidance information system could determine that the UAV 720 was at risk of a collision. In response to a collision avoidance data request, a collision risk determination, the end of a regular collision avoidance data update period, and/or some other causative event, the collision avoidance information system could send collision avoidance data regarding airborne obstacles in the airspace 712 to the UAV 720.

FIG. 7A further illustrates collision avoidance data sent to UAV 720 comprising determined airborne object locations 741, 742, 743 corresponding to respective airborne objects 731, 732, 733 in the airspace 712. Collision avoidance data sent to the UAV 720 could further include trajectories, identities, capabilities, configurations, or other data corresponding to the airborne objects 731, 732, 733. Collision avoidance data sent to the UAV 720 could additionally include an indication of which, if any, of the airborne objects described by information in the collision avoidance data are receiving collision avoidance data from the collision avoidance information system. The UAV 720 could then place greater emphasis on avoiding airborne objects that are not receiving collision avoidance data from the collision avoidance information system, as those airborne objects might be less informed about the location of the UAV 720.

Collision avoidance data sent to the UAV 720 could include filtered versions of the data described above. For example, the sent collision avoidance data could include airborne object locations, airborne object trajectories, ground-based object locations and dimensions, or other data at a lower resolution than is available to the collision avoidance information system. For example, the sent collision avoidance data could include airborne object locations, airborne object trajectories, ground-based object locations and dimensions, or other data corrupted by a random or pseudorandom noise signal by the collision avoidance information system.

FIG. 7B further illustrates a region 750 proximate to the UAV 720. Collision avoidance data sent to UAV 720 includes the determined airborne object location 751 corresponding to respective airborne object 731 located within region 750. Collision avoidance data sent to UAV 720 does not include determined airborne object locations corresponding to objects located outside region 720 (e.g., airborne objects 732, 733) in the airspace 712. Collision avoidance data sent to the UAV 720 could further include trajectories, identities, capabilities, configurations, or other data corresponding to the airborne object 731. Collision avoidance data sent to the UAV 720 could additionally include an indication of which, if any, of the airborne objects described by information in the collision avoidance data are receiving collision avoidance data from the collision avoidance information system. The UAV 720 could then place greater emphasis on avoiding airborne objects that are not receiving collision avoidance data from the collision avoidance information system, as those airborne objects might be less informed about the location of the UAV 720.

Collision avoidance data sent to the UAV 720 could include filtered versions of the data described above. For example, the sent collision avoidance data could include airborne object locations, airborne object trajectories, ground-based object locations and dimensions, or other data at a lower resolution than is available to the collision avoidance information system. For example, the sent collision avoidance data could include airborne object locations, airborne object trajectories, ground-based object locations and dimensions, or other data corrupted by a random or pseudorandom noise signal by the collision avoidance information system.

The region 750 proximate to the UAV 720 that determines whether the determined location of an object in the airspace is included in the collision avoidance data sent to the UAV 720 by the collision avoidance information system is, for illustrative purposes only, a circle indicating a spherical volume proximate to the UAV 720. Other regions, having other shapes and sizes, could be used by the collision avoidance information system to determine what determined locations of airborne objects in the airspace 712 or other objects or structures in the airspace, if any, to include in collision avoidance data sent to the UAV 720. The region could be a sphere, an oblate spheroid, a cylinder, a cube, an arbitrary shape defined by polyhedra and/or other 3-D surfaces (e.g., NURBS), or some other volume according to an application.

The location, shape, size, or other properties of the region could be based on information sent by the UAV 720 to the collision avoidance information system, information about other objects in the airspace, and/or other information. For example, the region could be a cylinder that contains the indicated location of the UAV 720 and oriented such that the long axis of the cylinder was parallel to an indicated trajectory of the UAV 720. Other configurations of regions proximate to a UAV are anticipated according to an application.

In some embodiments, collision avoidance data sent to the UAV 720 could include raw and/or filtered 3D radar scan data of the region 750 proximate to the UAV 720 from 3D radar scans of the airspace 712. For example, the collision avoidance data could be raw radar reflection data corresponding to active radar pulses oriented toward the region 750 and only including raw radar reflection data with latencies relative to the active radar pulses such that the included raw radar reflection data only corresponds to reflections originating from within the region 750 proximate to the UAV 720. The collision avoidance data could additionally or alternatively include raw scan or other data from other sources, for example raw LIDAR reflection data, camera image data, raw topographic database data, or other data.

FIG. 7C further illustrates UAV 720 in airspace 712. Collision avoidance data sent to UAV 720 includes indicated volumes 781, 782, 783 corresponding to respective airborne objects 731, 732. 733 located within the indicated volumes 781, 782, 783. Knowledge of indicated volumes 781, 782, 783 does not enable exact determination of the locations of respective airborne objects 731, 732, 733. For example, the sent indicated volumes could be spheres with centers corresponding to airborne object locations, airborne object trajectories, ground-based object locations, or other data corrupted by a random or pseudorandom noise signal generated by the collision avoidance information system. UAV 720 could avoid colliding with airborne objects 731, 732, 733 in the airspace 712 by avoiding regions of the airspace contained in the indicated volumes 781, 782, 783.

Collision avoidance data sent to the UAV 720 could additionally include an indication of which, if any, of the indicated volumes 781, 782, 783 contain airborne objects that are receiving collision avoidance data from the collision avoidance information system. The UAV 720 could then place greater emphasis on avoiding volumes that contain airborne objects that are not receiving collision avoidance data from the collision avoidance information system, as airborne objects in those volumes might be less informed about the location of the UAV 720. Collision avoidance data sent to the UAV 720 could additionally include an indication of volumes in the airspace 712 that are likely to contain airborne objects or other obstacles in the future.

The indicated volumes could be spheres, oblate spheroids, cylinders, cubes, arbitrary shapes defined by polyhedra and/or other 3-D surfaces (e.g., NURBS), or other volumes according to an application. The location, shape, size, or other properties of the indicated volumes could be based on information sent by the UAV 720 to the collision avoidance information system, information about airborne objects or other obstacles in the airspace, and/or other information. For example, an indicated volume could be a cylinder that contains a location of an airborne object and oriented such that the long axis of the cylinder was substantially parallel to a trajectory of the airborne object. Other configurations of collision avoidance data including object-containing volumes are anticipated according to an application.

FIG. 7D further illustrates UAV 720 in airspace 712. The airspace 712 is described as including regions 390a-390l. Collision avoidance data sent to UAV 720 includes an indication of which of the regions 390a-390l in airspace 712 contain airborne objects 731, 732, 733 (390d and 390g in the example illustrated in FIG. 7D). UAV 720 could avoid colliding with airborne objects 731, 732, 733 in the airspace 712 by avoiding indicated regions 390d and 390l of the airspace 712. Collision avoidance data sent to the UAV 720 could additionally include an indication of which, if any, of the indicated regions 390d, 390l only contain airborne objects that are receiving collision avoidance data from the collision avoidance information system. The UAV 720 could then place greater emphasis on avoiding regions that contain airborne objects that are not receiving collision avoidance data from the collision avoidance information system, as airborne objects in those regions might be less informed about the location of the UAV 720.

Collision avoidance data sent to the UAV 720 could additionally include an indication of how many airborne objects or other obstacles occupy each indicated region, the configuration or other information about the indicated airborne objects or other obstacles, and/or some other information about the regions 390a-390l in the airspace 712. Collision avoidance data sent to the UAV 720 could additionally include an indication of regions in the airspace 712 that are likely to contain airborne objects or other obstacles at various points in the future.

The indicated volumes could be spheres, oblate spheroids, cylinders, cubes, arbitrary shapes defined by polyhedra and/or other 3-D surfaces (e.g., NURBS), or other volumes according to an application. The example regions 390a-390l are disjoint and comprise all of the volume within airspace 712; however, in some embodiments, the regions overlap and/or some of an airspace is not represented by any region. The regions could be defined according to a cartographic or other standard (e.g., sectors of latitude/longitude, FAA-defined airspaces and/or airspace classes) or arbitrarily by the collision avoidance information system according to an application. The regions could be redefined over time by a collision avoidance information system, and the collision avoidance information system could send updated region definitions to UAVs. Other configurations of collision avoidance data indicating which of a set of predefined regions in an airspace contain airborne objects or other obstacles are anticipated according to an application.

Note that instances herein where collision avoidance data are described being sent from a collision avoidance information system to a UAV are meant as illustrative examples only. Collision avoidance data could be sent from a collision avoidance information system directly to a UAV or could be sent through intermediate systems. For example, a collision avoidance information system could send collision avoidance data to a server(s) associated with the UAV, and the server(s) could then send information based on the collision avoidance data to the UAV. The UAV and the servers(s) could be associated with a subscribe entity that subscribes to a service provided by the collision avoidance information system. The UAV could be controlled by the server(s) and/or other systems external to the UAV. The systems external to the UAV could control the UAV based on collision avoidance data received by the external systems and/or UAV from a collision avoidance information system.

Further, UAVs are described herein as an example of an aerial vehicle that could receive collision avoidance data in order to avoid colliding with airborne obstacles. Aerial vehicles or other devices in an airspace other than UAVs could receive collision avoidance data from a collision avoidance information system according to an application.

Sending of collision avoidance data by a collision avoidance information system could be contingent upon a UAV, an aerial vehicle, and/or a subscriber entity associated with the UAV and/or aerial vehicle providing information to the collision avoidance information system. For example, the collision avoidance information system could require the UAV, the aerial vehicle, and/or a subscriber entity associated with the UAV and/or aerial vehicle to send a location, a trajectory, an identity, and/or some other information in order to receive collision avoidance data from the collision avoidance information system.

The collision avoidance data sent to UAVs, aerial vehicles, and/or other systems associated with a subscriber entity could be based on a subscription status of the subscriber entity. For example, a subscription status of a subscriber entity could specify that collision data sent to systems associated with the subscriber entity includes locations of airborne objects in the airspace within a specified radius of aerial vehicles and/or UAVs associated with the subscriber entity. For example, a subscription status of a subscriber entity could specify a rate at which collision avoidance data could be repeatedly transmitted over time to systems associated with a subscriber entity.

Sending of collision avoidance data by a collision avoidance information system could be contingent upon other factors. For example, location information associated with UAVs and/or aerial vehicles sent to the collision avoidance information system could be required to correspond to a location determined by the collision avoidance information system of an airborne object in the airspace. If the location information associated sent to the collision avoidance information system did not correspond to a determined location of an object in the airspace, the collision avoidance information system could not send collision avoidance data or could send less and/or degraded collision avoidance data to the UAV and/or aerial vehicle.

If the UAV and/or aerial vehicle is associated with a subscriber entity, a subscription status of the subscriber entity could be changed based on the lack of a determined location of an airborne object in the airspace that corresponds to the sent location information associated with the UAV and/or aerial vehicle. For example, the subscription status of the subscriber entity could be changed to specify that no collision avoidance data was to be sent to UAVs, aerial vehicles, and/or systems associated with the subscriber entity for a specified period of time. For example, the subscription status of the subscriber entity could be changed to specify that less and/or degraded collision avoidance data was to be sent to UAVs, aerial vehicles, and/or systems associated with the subscriber entity for a specified period of time. Other subscription status changes and contingent factors for sending of collision avoidance data are anticipated.

V. Illustrative Collision Avoidance Information Systems

Figure 8:
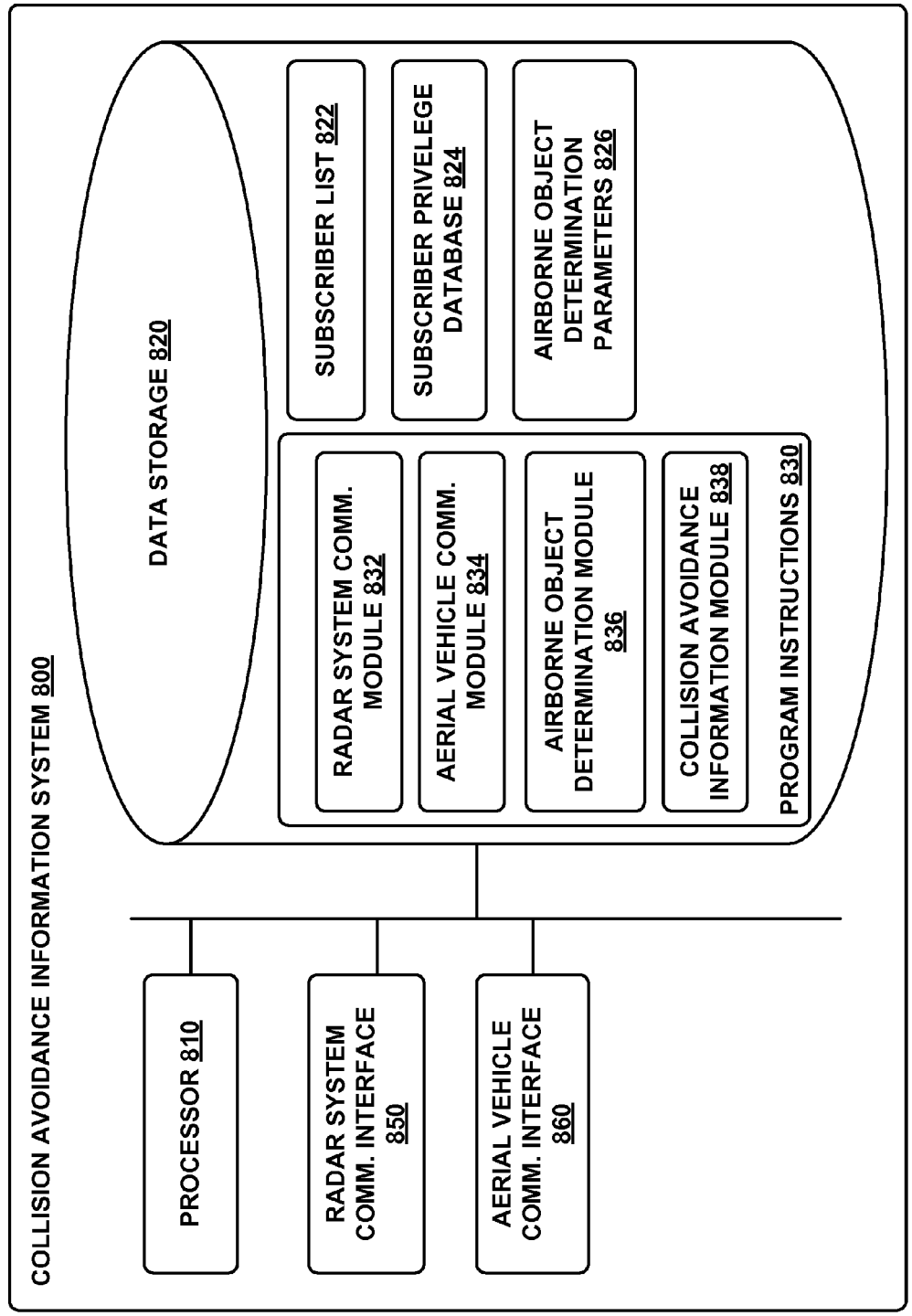
FIG. 8 is an illustration of a collision avoidance information system, according to an example embodiment.

FIG. 8 is a simplified block diagram illustrating components of a collision avoidance information system 800, according to an example embodiment. Collision avoidance information system 800 may be implemented as a standalone system, such as a dedicated server, computer, or other system, or could be implemented as part of another system. For example, the collision avoidance system could be implemented as a component of a radar installation or implemented as part of a server or computer configured to perform other tasks, such that some or all of the components of the collision avoidance information system 800 described herein could be shared with other systems.

In the illustrated embodiment, collision avoidance information system 800 includes one or more processors 810. A processor 810 may be a general-purpose processor or a special purpose processor (e.g., digital signal processors, application specific integrated circuits, etc.). The one or more processors 810 can be configured to execute computer-readable program instructions 830 that are stored in the data storage 820 and are executable to provide the functionality of a collision avoidance information system described herein.

The data storage 820 may include or take the form of one or more computer-readable storage media that can be read or accessed by at least one processor 810. The one or more computer-readable storage media can include volatile and/or non-volatile storage components, such as optical, magnetic, electronic, organic, or other memory or disc storage, which can be integrated in whole or in part with at least one of the one or more processors 810. In some embodiments, the data storage 820 can be implemented using a single physical device (e.g., one optical, magnetic, electronic, organic, or other memory or disc storage unit), while in other embodiments, the data storage 820 can be implemented using two or more physical devices.

As noted, the data storage 820 can include computer-readable program instructions 830 and perhaps additional data, such as a subscriber list 822, a subscriber privilege database 824, parameters of an airborne object determination module or algorithm 826, diagnostic data of the collision avoidance information system, stored collision avoidance information, or other information. As such, the data storage 820 may include program instructions to perform or facilitate some or all of the collision avoidance information system functionality described herein. For instance, in the illustrated embodiment, program instructions 830 include a radar system communications module 832, an aerial vehicle communications module 834, an airborne object determination module 836, and a collision avoidance information module 838.

In the illustrated embodiment, collision avoidance information system 800 includes a radar system communications interface 850 and an aerial vehicle communications interface 860. These components of the collision avoidance information system 800 are configured to facilitate communication one or more radar systems and one or more aerial vehicles, respectively. The radar system communications interface 850 and aerial vehicle communications interface 860 can include components configured to enable communication with a radar system and aerial vehicles, respectively, over a wired or wireless information interface. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), the infrared data association (IrDA) protocol, a radio-frequency ID (RFID) protocol, near-field communication (NFC), and/or other wireless communication protocols. Such wired interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

The radar system communications module 832 and aerial vehicle communications module 834 could include instructions enabling the collision avoidance information system 800 to operate the radar system communications interface 850 and the aerial vehicle communications interface 860, respectively. The modules 832, 834 could include instructions enabling configuration of the interfaces 850, 860, generation and transmission of transmitted information, and reception and interpretation of received information. The modules 832, 834 could include instructions enabling secure communications (e.g., enabling cryptographic encoding/decoding of communications over the interfaces 850, 860). The aerial vehicle communications module 834 could include instructions enabling verification that an aerial vehicle, server or other system in communication with the collision avoidance system 800 was associated with a subscriber entity (for example, a subscriber entity from a list of subscriber entities 822 in the data storage 820).

Communication with a radar system and/or an aerial vehicle could be direct or through intermediary systems, for example a server, a relay station, or some other device. The radar system communications interface 850 and the aerial vehicle communications interface 860 could be the same device or component within the collision avoidance information system 800. For example, in embodiments where communications with a radar system and communications with an aerial vehicle are implemented by communicating through the internet, the radar system communications interface 850 and the aerial vehicle communications interface 860 can both be implemented in a single internet interface component (e.g., a WiFi (e.g., an IEEE 802.11 protocol), Long-Term Evolution (LTE), WiMAX (e.g., an IEEE 802.16 standard), and/or ethernet interface). In embodiments wherein the collision avoidance information system is collocated with a radar installation or otherwise incorporated as part of a radar installation, the radar system communications interface 850 could be an API allowing the collision avoidance information system 800 to access radar data from components of the radar installation.

Computer-readable program instructions 830 include an airborne object determination module 836 that includes instructions enabling the collision avoidance information system 800 to determine information about airborne objects in the airspace based on radar scan data received from the one or more radar installations. Determined information about airborne objects in the airspace could include locations, trajectories, sizes, configurations, identities, and/or other information. In some examples, received radar scan data could include direction and timing information for a beam of radio frequency energy transmitted by the radar station and information corresponding to a received reflection from airborne objects in the airspace of the transmitted beam of radio frequency energy.

The airborne object determination module 836 could include instructions enabling the determination of a location of an airborne object based on the direction of the transmitted beam and a time difference between the time of transmission of the transmitted beam and a time of reception of a pulse of received reflected radio frequency energy. The airborne object determination module 836 could include instructions enabling the determination of a speed of an airborne object based on a difference between a frequency of the beam of transmitted radio frequency energy and a frequency of a pulse of received reflected radio frequency energy. Other information about an airborne object in an airspace could be determined, and other methods for determining the information could be enabled by the airborne object determination module 836.

The airborne object determination module 836 could rely on information about the airspace, the radar installation, airborne objects in the airspace, and/or other information to determine the information about airborne objects in the airspace. Airborne object determination parameters 826 could be stored in the data storage 820 and could be used by the airborne object determination module 836 to determine information about airborne objects in the airspace. Airborne object determination parameters 826 could include information about the environment of the airspace, the topography of the earth beneath the airspace, properties of structures within the airspace, the speed of propagation of radio frequency information, profiles of received reflected radio frequency energy corresponding to respective types of airborne objects, correction factors for models, formulas, or other methods used by the airborne object determination module 836 and/or other information.

Computer-readable program instructions 830 include a collision avoidance information module 838 that includes instructions enabling the collision avoidance information system to provide a collision avoidance information service. The collision avoidance information module 838 could include instructions enabling the receiving of data about an airspace (e.g., data from 3-D radar scans of the airspace), generating information based on airborne objects, ground-based structures, or other obstacles in or bordering the airspace, and transmitting the information to facilitate the operation of aerial vehicles in the airspace. The collision avoidance information module 838 could further include instructions that enable, disable, or modify functions of the collision avoidance information system 800 based on information received from aerial vehicles, subscriber information about subscribers associated with aerial vehicles, information about airborne objects in the airspace, and/or other information.

The collision avoidance information module 838 could rely on information about subscribers to a collision avoidance information service. For example, the data storage 820 could include a subscriber list 822 and/or a subscriber privilege database 824. The collision avoidance information module 838 could use information in the subscriber list 822 and/or subscriber privilege database 824 to determine what functions the collision avoidance information system 800 should perform. In some examples, the collision avoidance information module 838 could include instructions to transmit collision avoidance information to facilitate the operation of a particular aerial vehicle if the particular aerial vehicle is associated with a subscriber from the subscriber list 822.

In some examples, the collision avoidance information system could provide different types of collision avoidance data or other services to different subscribers based on information in the subscriber privilege database 824. For example, a first subscriber could receive collision avoidance data including locations, trajectories, and identities of airborne objects or other obstacles in the airspace, while a second subscriber could receive flight instructions to facilitate collision avoidance by aerial vehicles associated with the second subscriber. Other subscriber-based functions of the collision avoidance information system 800 could be enabled by the collision avoidance information module 838.

The collision avoidance information module 838 could require receipt of information about aerial vehicles in order to provide data to facilitate operation of the aerial vehicles. For example, the collision avoidance information module 838 could require receipt of location data associated with a particular aerial vehicle before transmitting data to facilitate operation of the particular aerial vehicle. The data transmitted to facilitate the operation of the aerial vehicles could be based on the received information associated with the aerial vehicles. In some examples, the data transmitted to facilitate the operation of a particular aerial vehicle could be based only on determined information about airborne objects or other obstacles proximate to a received location of the particular aerial vehicle.

In some examples, the collision avoidance information module 838 could include instructions to not send data (or to provide less data) to facilitate the operation of a particular aerial vehicle if two conditions were met, where the first condition includes the received location data indicating a location within the scanned airspace and the second condition includes the received location data not corresponding to a determined location of an airborne object in the airspace. In some examples, a subscription status of a subscriber entity associated with the aerial vehicle could be changed in response to the two conditions being met. For example, the subscription status could be changed such that aerial vehicles, servers, and/or other system associated with the subscriber entity could not receive transmitted collision avoidance data and/or instructions from the collision avoidance information system 800.

Figure 9:
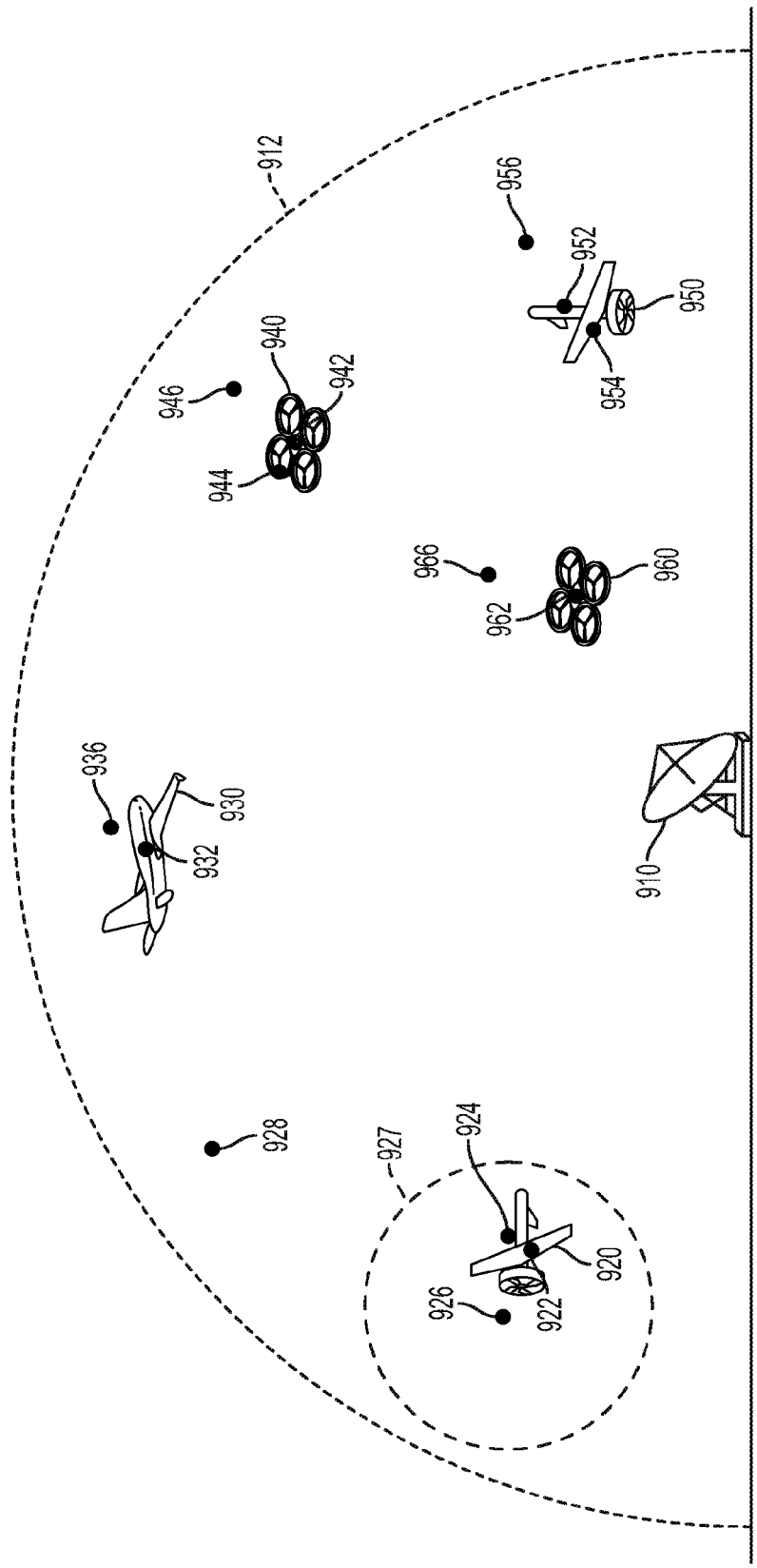
FIG. 9 is an illustration of example actual, determined, and indicated locations of example airborne objects in an airspace.

As an example illustration of the above scenario, FIG. 9 illustrates an airspace 912 being scanned by a radar installation 910. The airspace 912 contains an aerial vehicle 920 having a location 922. Determined location 926 indicates a location of an aerial object determined by a collision avoidance information system corresponding to the location of the aerial vehicle 920. Proximate region 927 illustrates a region proximate to the determined location 926. Received location 924 indicates a location associated with the aerial vehicle 920 within the proximate region 927 that could be received by the collision avoidance information system such that the collision avoidance information system could continue to provide data to facilitate the operation of the aerial vehicle 920. Received location 928 indicates a location associated with the aerial vehicle 920 outside the proximate region 927 that could be received by the collision avoidance information system such that the collision avoidance information system could discontinue providing data to facilitate the operation of the aerial vehicle 920. Additionally or alternatively, the collision avoidance information system could alter a subscription status of a subscriber entity associated with the aerial vehicle 920 in response to receiving received location 928.

The collision avoidance information module 838 could include instructions enabling the collision avoidance information system 800 to generate and transmit collision avoidance instructions to facilitate the operation of aerial vehicles. Collision avoidance instructions could include instructions to follow one or more safe paths, where the one or more safe paths define paths that could be followed by a particular aerial vehicle such that the particular aerial vehicle could avoid colliding with airborne objects or other obstacles. Collision avoidance instructions could include descriptions of one or more flight instructions (e.g., bank right, increase altitude 100 meters, reduce pitch 20 degrees for 30 seconds) that could be executed by a particular aerial vehicle such that the particular aerial vehicle could avoid colliding with airborne objects or other obstacles.

Collision avoidance instructions could include a plurality of instructions over time to actuate a particular aerial vehicle in a certain way (i.e., the collision avoidance system 800 could act as a remote controller for the particular aerial vehicle) that could be executed by the particular aerial vehicle such that the particular aerial vehicle could avoid colliding with airborne objects or other obstacles. The type of collision avoidance instructions generated and transmitted by the collision avoidance information system 800 could be based on information in a subscriber list 822 and/or a subscriber privilege database 824.

The collision avoidance information module 838 could include instructions enabling the collision avoidance information system 800 to generate, filter, and transmit collision avoidance data to facilitate collision avoidance by aerial vehicles. Filtering collision avoidance data could include transmitting all collision avoidance data that is available to the collision avoidance information system 800. Filtering collision avoidance data could include not transmitting collision avoidance data corresponding to obstacles that are not proximate to a particular aerial vehicle. Filtering collision avoidance data could include degrading, corrupting, or otherwise decreasing the collision avoidance data. For example, the transmitted collision avoidance data could have reduced resolution compared to collision avoidance data available to the collision avoidance information system 800. Filtering collision avoidance data could include only indicating sectors or other volumes of an airspace in which airborne objects or other obstacles could be located.

The collision avoidance information module 838 could include instructions enabling the collision avoidance information system 800 to receive location, trajectory, and/or other information corresponding to a plurality of aerial vehicles. The collision avoidance information system could then use this information to update an algorithm or other method used by the airborne object determination module 836 to determine the location, trajectory, and/or other information corresponding to airborne objects in the airspace such that locations, trajectories, and/or other information corresponding to airborne objects determined using the updated algorithm or other method are more accurate than locations, trajectories, and/or other information corresponding to airborne objects determined using the original, pre-update algorithm or other method. Updating an algorithm or other method could include altering the airborne object determination module 836, the airborne object determination parameters, and/or some other element of the collision avoidance information system 800.

As an example illustration of the above scenario, FIG. 9 illustrates an airspace 912 being scanned by a radar installation 910. The airspace 912 contains aerial vehicles 920, 940, and 950 having respective locations 922, 942, 952. The airspace 912 additionally includes airborne objects 930 and 960 having respective locations 932 and 962. Determined locations 926, 946, and 956 indicate locations of respective airborne objects determined by a collision avoidance information system corresponding to respective locations of the aerial vehicles 920, 940, and 960. The airspace 912 further includes airborne objects 930 and 960 having respective locations 932 and 962.

Determined locations 936 and 966 indicate locations of respective airborne objects determined by the collision avoidance information system corresponding to respective airborne objects 930 and 960. Received locations 924, 944, and 954 indicate locations associated with respective aerial vehicles 920, 940, and 950 that could be received by the collision avoidance information system. The collision avoidance information system could use indicated locations received from aerial vehicles and corresponding respective determined locations of airborne objects to update an algorithm or other method used by the collision avoidance information system to determine locations, trajectories, and/or other information about airborne objects in the airspace 912 based on information from radar scans of the airspace. In the example of FIG. 9, the collision avoidance information system could adjust a transmit latency parameter of a method used to determine locations of airborne objects in the airspace 912 such that determined locations of airborne objects in the airspace 912 determined using the updated method were more accurate.

VI. Example Subscription Services

Collision avoidance information systems as described herein could provide collision avoidance data and/or instructions according to a subscription model. That is, providing collision avoidance data and/or instructions to UAVs, aerial vehicles, or other systems could be contingent on the UAVs, aerial vehicles, or other systems being associated with a subscriber entity. The subscriber entity could be any entity that subscribes to a subscription collision avoidance service provided by the collision avoidance information system.

In some examples, a subscription to a collision avoidance service could be provided for a specified period of time. For example, a subscription could specify that a subscriber entity and/or systems associated with the subscriber entity could access the service for a year, a month, a day, or some other period of time. In some examples, a subscription to a collision avoidance service could be provided for a specified duration of use of the service. For example, a subscription could specify that a subscriber entity and/or systems associated with the subscriber entity could access the service for a set number of hours, where use of the service for the set number of hours is not necessarily continuous and uninterrupted. That is, the subscriber entity could log in to the service (or otherwise initiate a period of use of the service) in order to gain access to collision avoidance data and/or instructions. At a later time, the subscriber could log out (or otherwise indicate termination of use of the service) and terminate access to collision avoidance data and/or instructions. A balance of remaining hours of the set number of hours of the subscription could then be decremented by an amount equal to the duration of use of the service (e.g., the time between the log in and log out events).

A subscription to a collision avoidance service could specify one or more requirements or prerequisites that a subscriber must satisfy in order to access collision avoidance data and/or instructions. In some examples, a subscription could require a subscriber entity and/or aerial vehicles or other systems associated with the subscriber entity to provide proof of compliance with rules regulating the use of an airspace, access to information about an airspace, and/or the operation of aerial vehicles in an airspace. For example, it could be required that a subscriber entity accessing data about an airspace in the United States provide proof of compliance with regulations imposed by the FAA or some other state or federal agency. In some examples, a subscription could require that a subscriber entity provide valid location, trajectory, configuration, identity, and/or other information corresponding to aerial vehicles associated with the subscriber entity. Other prerequisites or requirements for accessing a collision avoidance service are anticipated.

A subscription could specify the types of collision avoidance data and/or instructions that that are accessible to aerial vehicles or other systems associated with a subscriber entity. In some examples, a subscription could specify that a subscriber entity could access determined locations and trajectories or airborne objects or other obstacles in an airspace. In some examples, subscription could specify that a subscriber entity could access collision avoidance data including a list of specified volumes in an airspace that contain airborne objects or other obstacles. In some examples, a subscription could specify that an aerial vehicle associated with a subscriber entity could receive control outputs for actuators on the aerial vehicle (i.e., the collision avoidance information system acts as a remote controller for the aerial vehicle). This service could be provided so that an aerial vehicle lacking sufficient onboard and/or remote controllers to operate in a crowded or otherwise dangerous airspace could operate in the crowded or otherwise dangerous airspace by being remotely controlled by the collision avoidance information system. Other collision avoidance data and/or instructions specified by a subscription are anticipated.

In some examples, a subscription to a collision avoidance service could be provided for a specified number of aerial vehicles. For example, a subscription could specify that a specified set of aerial vehicles (or systems associated with those vehicles) associated with the subscriber entity could access the service. The subscriber entity could be associated with additional aerial vehicles not included in the set specified by the subscription. The subscription could specify that different aerial vehicles in the set of aerial vehicles have access to different collision avoidance data and/or instructions. For example, a first aerial vehicle could have access to determined locations and trajectories of airborne objects or other obstacles in an airspace and a second aerial vehicle could additionally or alternately have access to flight instructions that could be executed by the second aerial vehicle to avoid colliding with airborne objects or other obstacles in the airspace. In some examples, the subscription could identify specific aerial vehicles as having access to the collision avoidance data and/or instructions. Additionally or alternatively, the subscription could specify that a maximum number of aerial vehicles associated with a subscriber entity could have simultaneous access to collision avoidance data and/or instructions, where the identities of the aerial vehicles are not specified by the subscription.

The services of a collision avoidance information system that are accessible by a subscriber entity (i.e., a subscription status of the subscriber entity) could be modified (i.e., the subscription status could be altered) due to actions of the subscriber entity or the actions of aerial vehicles or other systems associated with the subscriber entity. In some examples, a subscription status of a subscriber entity could be altered if a reported location of an aerial vehicle associated with the subscriber entity was false (that is, the reported location did not correspond to a location of a corresponding airborne object as determined by a collision avoidance information system). For example, a subscriber entity could have access to collision avoidance instructions for an aerial vehicle in addition to location and trajectory data for airborne objects or other obstacles proximate to the aerial vehicle before reporting a false location of the aerial vehicle. After reporting the false location, a subscription status of the subscriber entity could be changed such that the subscriber only had access to collision avoidance instructions for the aerial vehicle. Additionally or alternatively, a subscription status of the subscriber entity could be changed such that the subscriber no longer had access to any collision avoidance data or instructions. Other changes to a subscription status of a subscriber to a collision avoidance service are anticipated.

Changing a subscription status of a subscriber could depend on actions of aerial vehicles associated with the subscriber and/or the status of the airspace in which the aerial vehicles are operating. For example, if an aerial vehicle was in the process of maneuvering to avoid a collision and/or if the aerial vehicle was operating in a crowded region of an airspace, a change in subscription status could be delayed until there was no longer a danger of collision between the aerial vehicle and airborne objects or other obstacles in the airspace.

Additionally or alternatively, a change in subscription status of the subscriber could be delayed until the aerial vehicle had landed. Changes in a subscription status could be made and/or delayed such that the safety of people, aerial vehicles, and objects in the airspace was preserved. A collision avoidance information system providing a collision avoidance service could operate in adherence with state, federal, and any other applicable regulations.

Sending of collision avoidance data by a collision avoidance information system could be contingent upon other factors. For example, location information associated with UAVs and/or aerial vehicles sent to the collision avoidance information system could be required to correspond to a location determined by the collision avoidance information system of an airborne object in the airspace. If the location information associated sent to the collision avoidance information system did not correspond to a determined location of an object in the airspace, the collision avoidance information system could not send collision avoidance data or could send less and/or degraded collision avoidance data to the UAV and/or aerial vehicle.

Other methods of providing and/or gating access to a collision avoidance service are anticipated. In some examples, collision avoidance data and/or instructions could be provided to any aerial vehicle or system associated with an aerial vehicle that provide a valid location and/or other information about the aerial vehicle. In some examples, collision avoidance data and/or instructions could be provided to any aerial vehicle or system associated with an aerial vehicle that correctly implements an API and/or other specified access control or communications program and/or component. In some examples, access to a collision avoidance service could be provided to aerial vehicles and/or subscriber entities that have received a specified transponder, cryptographic key, or other access control device or information.

VII. Illustrative Methods

Figure 10:
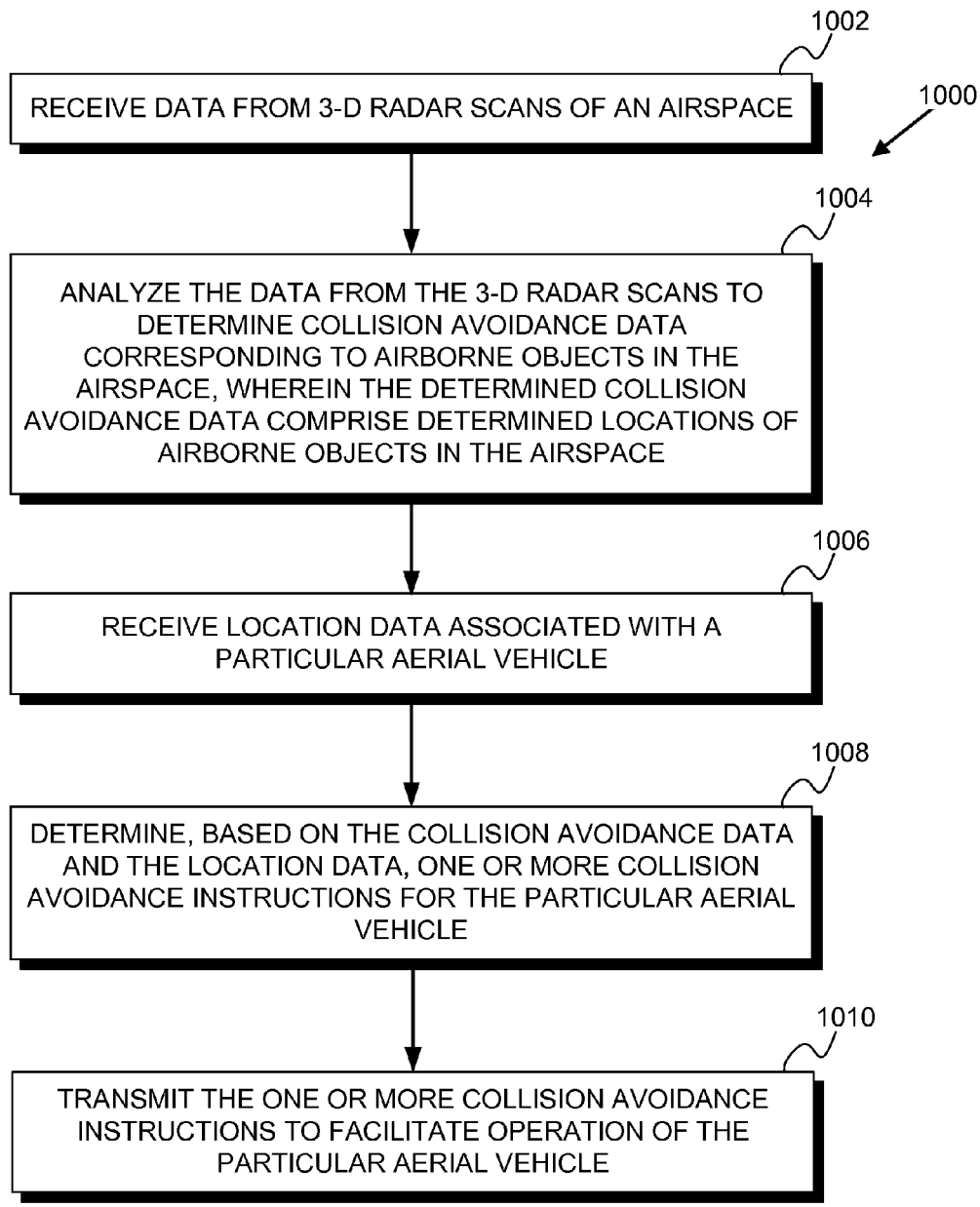
FIG. 10 is a flowchart of a process, according to an example embodiment.

FIG. 10 is a flowchart of a process 1000 for generating and transmitting collision avoidance instructions to facilitate operation of an aerial vehicle. The process 1000 includes receiving data from 3-D radar scans of an airspace (1002). For example, the data could be received from one or more radar installations configured to scan the airspace and to generate data that can be used to determine information about airborne objects or other obstacles in the airspace.

The data from the 3-D radar scans is analyzed to determine collision avoidance data corresponding to airborne objects or other obstacles in the airspace, where the determined collision avoidance data includes determined locations of airborne objects or other obstacles in the airspace (1004). For example, the received data from 3-D radar scans of the airspace could include recordings of radio frequency energy directed from a radar installation into the airspace and reflected from airborne objects or other obstacles in the airspace. The locations of respective airborne objects or other obstacles in the airspace could be determined based on the recorded reflected radio frequency energy, the relative timing and/or direction of the radio frequency energy directed into the airspace by the radar installation.

Location data associated with a particular aerial vehicle is received (1006). For example, an aerial vehicle could transmit an indication of its location. Additionally or alternatively, a server or other system in communication with an aerial vehicle could transmit an indication of the location of the aerial vehicle.

One or more collision avoidance instructions for the particular aerial vehicle are determined based on at least the collision avoidance data and the location data (1008). For example, it could be determined that the particular aerial vehicle was proximate to an airborne object or other obstacle. It could be further determined that the particular aerial vehicle could increase its altitude by an amount to avoid collision with the airborne object or other obstacle. A collision avoidance instruction including an instruction to increase altitude could be determined.

The one or more collision avoidance instructions are transmitted to facilitate operation of the particular aerial vehicle (1010). For example, the one or more collision avoidance instructions could be transmitted to the aerial vehicle. Additionally or alternatively, the one or more collision avoidance instructions could be transmitted to a server or other system in communication with the aerial vehicle.

The process 1000 for generating and transmitting collision avoidance instructions to facilitate operation of an aerial vehicle could include additional steps. For example, the process 1000 could include determining that the particular aerial vehicle was at risk of collision with an airborne object or other obstacle, and transmitting the one or more collision avoidance instructions (1010) could be performed in response to that determination. For example, the process 1000 could include maintaining a list of subscribers authorized to receive collision avoidance data. Transmitting the one or more collision avoidance instructions (1010) could be performed in response to a determination that the particular aerial vehicle was associated with a subscriber from the list of subscribers. Other additional steps of process 1000 and/or modifications of the described elements 1002, 1004, 1006, 1008, 1010 of the process 1000 are anticipated.

Figure 11:
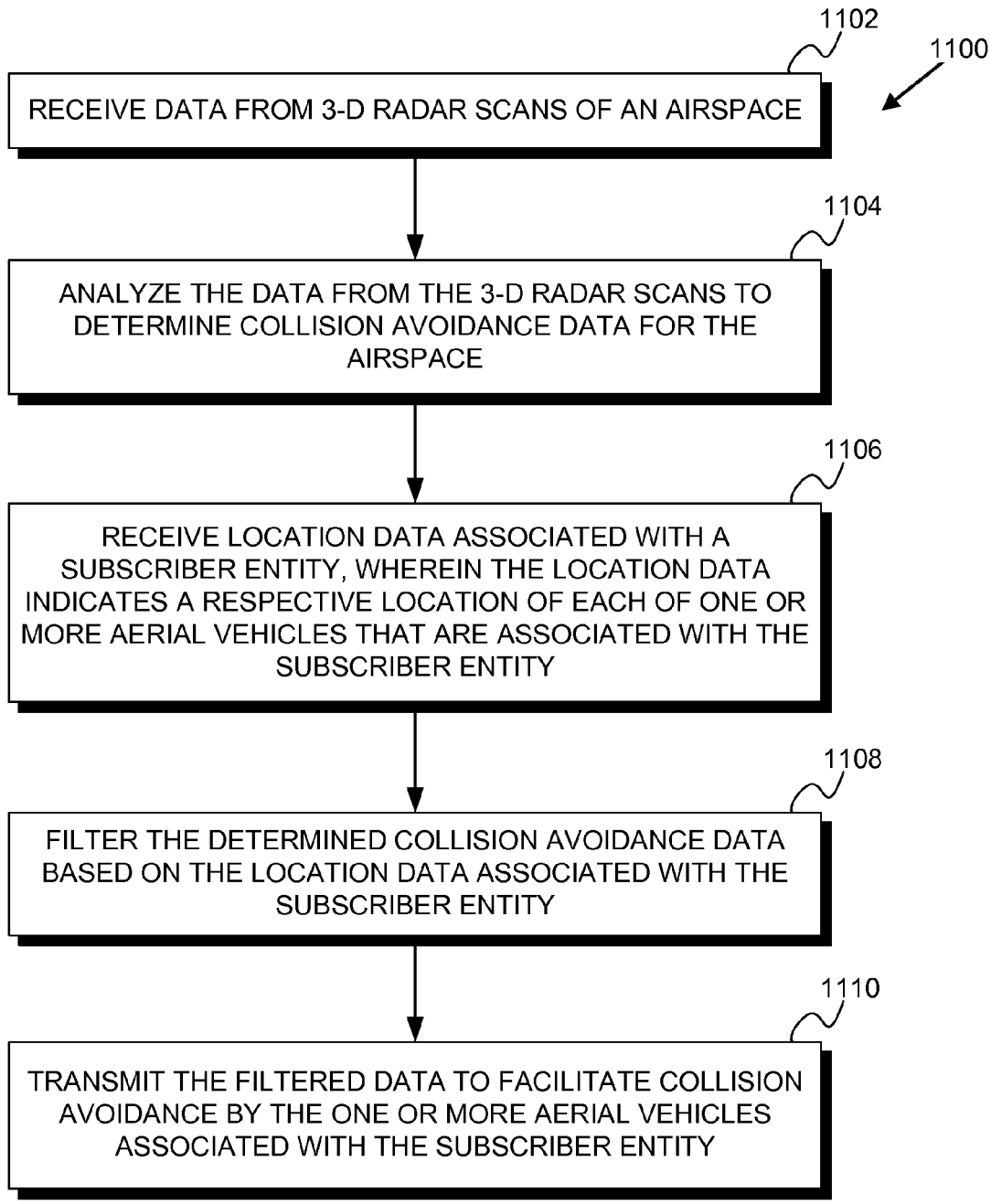
FIGS. 11 and 12 are flowcharts of processes, according to example embodiments.

FIG. 11 is a flowchart of a process 1100 for generating and transmitting data to facilitate collision avoidance by one or more aerial vehicles. The process 1100 includes receiving data from 3-D radar scans of an airspace (1102). For example, the data could be received from one or more radar installations configured to scan the airspace and to generate data that can be used to determine information about airborne objects or other obstacles in the airspace.

The data from the 3-D radar scans is analyzed to determine collision avoidance data for the airspace (1104). For example, the received data from 3-D radar scans of the airspace could include recordings of radio frequency energy directed from a radar installation into the airspace and reflected from airborne objects or other obstacles in the airspace. The locations of respective airborne objects or other obstacles in the airspace could be determined based on the recorded reflected radio frequency energy, the relative timing and/or direction of the radio frequency energy directed into the airspace by the radar installation.

Location data associated with a subscriber entity is received, wherein the location data indicates respective locations of each of one or more aerial vehicles associated with the subscriber entity (1106). For example, the one or more aerial vehicles associated with the subscriber entity could transmit an indication of a respective location of each of the one or more aerial vehicles. Additionally or alternatively, a server or other system in communication with the one or more aerial vehicles could transmit an indication of the respective locations of one or more aerial vehicles.

The determined collision avoidance data is filtered based on the location data associated with the subscriber entity (1108). For example, the collision avoidance data could include locations, trajectories, and/or other data corresponding to airborne objects or other obstacles in the airspace and filtering the collision avoidance data could include removing locations, trajectories, and/or other data corresponding to airborne objects or other obstacles that are not within one or more regions proximate to respective indicated locations of the one or more aerial vehicles associated with the subscriber entity.

The filtered data is transmitted to facilitate collision avoidance by the one or more aerial vehicles associated with the subscriber entity (1110). For example, the filtered data could be transmitted to a server associate with the subscriber entity. The server could then transmit the filtered data to the one or more aerial vehicles associated with the subscriber entity. Additionally or alternatively, the server could control the one or more aerial vehicles based on the transmitted filtered data.

The process 1100 for generating and transmitting data to facilitate collision avoidance by one or more aerial vehicles could include additional steps. In some examples, the process 1100 could include maintaining a maintaining a subscriber privilege database. Filtering the determined collision avoidance data (1108) could be based on information in the subscriber privilege database corresponding to the subscriber entity.

In some examples, the process 1100 could additionally include receiving location data associated with a plurality of subscriber entities and transmitting information based on the determined collision avoidance data to facilitate collision avoidance by one or more aerial vehicles associated with the plurality of subscriber entities. In these examples, the filtered data transmitted to facilitate collision avoidance could include the location, trajectory, or other information associated with airborne objects in the airspace and could additionally include an indication of which, if any, of the airborne objects in the airspace correspond to any of the one or more aerial vehicles associated with the plurality of subscriber entities. Other additional steps of process 1100 and/or modifications of the described elements 1102, 1104, 1106, 1108, 1110 of the process 1100 are anticipated.

Figure 12:
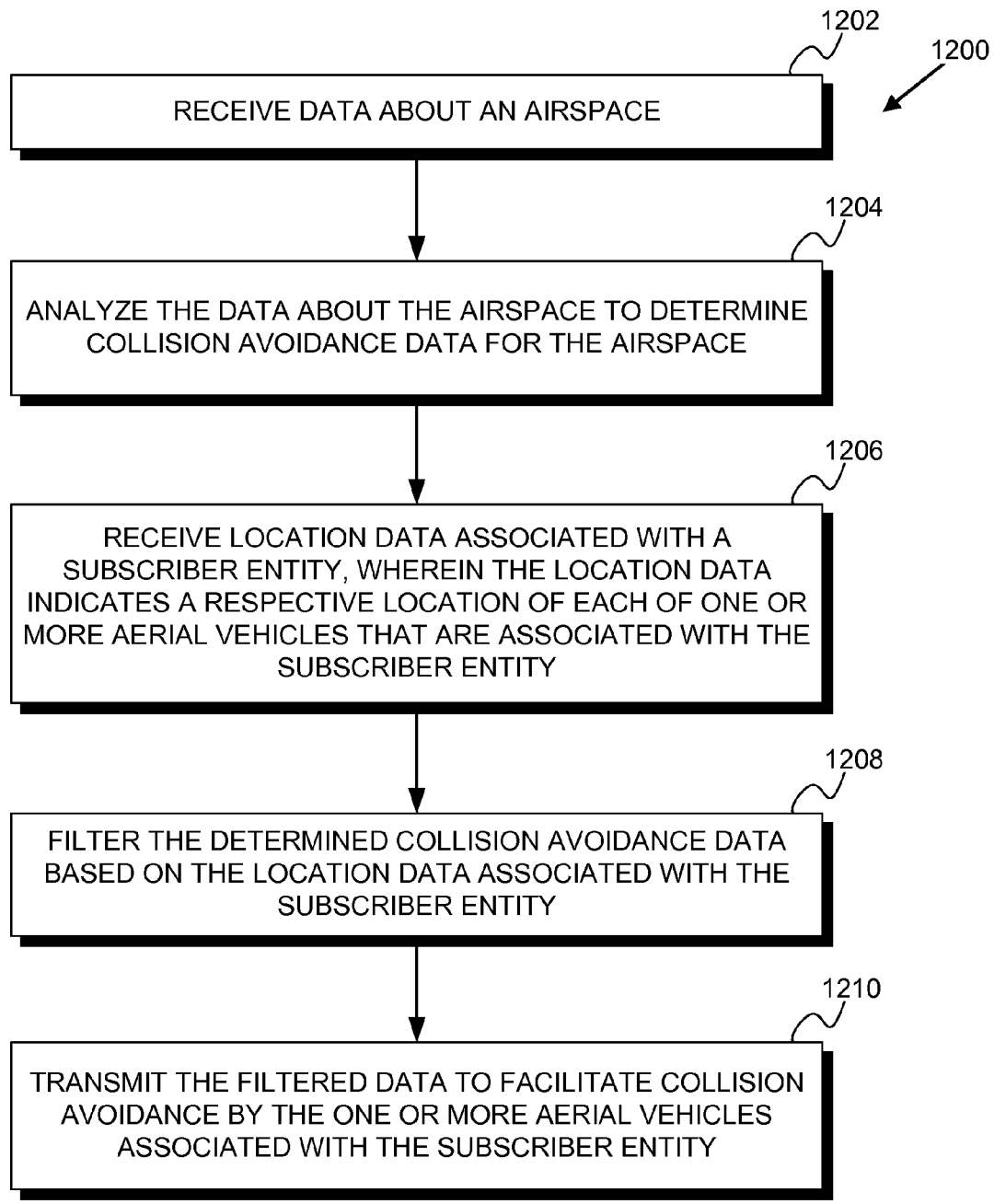

FIG. 12 is a flowchart of a process 1200 for generating and transmitting data to facilitate collision avoidance by one or more aerial vehicles. The process 1200 includes receiving data about an airspace (1202). In some examples, the data could be 3-D radar scan data of the airspace received from one or more radar installations configured to scan the airspace and to generate data that can be used to determine information about airborne objects in the airspace. In some examples, the data could be light direction and ranging (LIDAR) scan data of the airspace received from one or more LIDAR installations configured to scan the airspace and to generate data that can be used to determine information about airborne objects in the airspace. The data about the airspace could additionally or alternatively be received from one or more cameras, magnetometers, sound navigation and ranging (SONAR) systems, or other sensor systems configured to produce data about the airspace that could include information about obstacles in the airspace.

The data about the airspace is analyzed to determine collision avoidance data for the airspace (1204). For example, received data from 3-D radar scans of the airspace could include recordings of radio frequency energy directed from a radar installation into the airspace and reflected from airborne objects in the airspace. The locations of respective airborne objects in the airspace could be determined based on the recorded reflected radio frequency energy, the relative timing and/or direction of the radio frequency energy directed into the airspace by the radar installation. Other data sources and methods for determining locations, trajectories, identities, and/or other information about airborne objects or other obstacles in the airspace are anticipated.

Location data associated with a subscriber entity is received, wherein the location data indicates respective locations of each of one or more aerial vehicles associated with the subscriber entity (1206). For example, the one or more aerial vehicles associated with the subscriber entity could transmit an indication of a respective location of each of the one or more aerial vehicles. Additionally or alternatively, a server or other system in communication with the one or more aerial vehicles could transmit an indication of the respective locations of one or more aerial vehicles.

The determined collision avoidance data is filtered based on the location data associated with the subscriber entity (1208). For example, the collision avoidance data could include locations, trajectories, and/or other data corresponding to airborne objects or other obstacles in the airspace and filtering the collision avoidance data could include removing locations, trajectories, and/or other data corresponding to airborne objects or other obstacles that are not within one or more regions proximate to respective indicated locations of the one or more aerial vehicles associated with the subscriber entity.

The filtered data is transmitted to facilitate collision avoidance by the one or more aerial vehicles associated with the subscriber entity (1210). For example, the filtered data could be transmitted to a server associate with the subscriber entity. The server could then transmit the filtered data to the one or more aerial vehicles associated with the subscriber entity. Additionally or alternatively, the server could control the one or more aerial vehicles based on the transmitted filtered data.

The process 1200 for generating and transmitting data to facilitate collision avoidance by one or more aerial vehicles could include additional steps. In some examples, the process 1200 could include maintaining a maintaining a subscriber privilege database. Filtering the determined collision avoidance data (1208) could be based on information in the subscriber privilege database corresponding to the subscriber entity.

In some examples, the process 1200 could additionally include receiving location data associated with a plurality of subscriber entities and transmitting information based on the determined collision avoidance data to facilitate collision avoidance by one or more aerial vehicles associated with the plurality of subscriber entities. In these examples, the filtered data transmitted to facilitate collision avoidance could include the location, trajectory, or other information associated with airborne objects in the airspace and could additionally include an indication of which, if any, of the airborne objects in the airspace correspond to any of the one or more aerial vehicles associated with the plurality of subscriber entities. Other additional steps of process 1200 and/or modifications of the described elements 1202, 1204, 1206, 1208, 1210 of the process 1200 are anticipated.

CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A process comprising:
   receiving, from at least one radar installation, data from 3-D radar scans of an airspace;
   analyzing the data from the 3-D radar scans to determine collision avoidance data corresponding to airborne objects in the airspace, wherein the determined collision avoidance data comprise determined locations of airborne objects in the airspace;
   maintaining a list of subscriber entities authorized to receive collision avoidance data;
   receiving location data associated with a particular aerial vehicle;
   determining that the particular aerial vehicle is associated with a subscriber entity from the list of subscriber entities;
   responsive to determining that the particular aerial vehicle is associated with a subscriber entity from the list of subscriber entities:
      determining, based on the collision avoidance data and the location data associated with the particular aerial vehicle, one or more collision avoidance instructions for the particular aerial vehicle; and
      transmitting the one or more collision avoidance instructions to facilitate operation of the particular aerial vehicle.

2. The process of claim 1, further comprising:
   receiving trajectory data associated with the particular aerial vehicle;
   wherein collision avoidance instructions comprise instructions to follow one of one or more safe paths, wherein the one or more safe paths are determined based at least on the received location and trajectory data associated with the particular aerial vehicle and the determined collision avoidance data, wherein the one or more safe paths define paths that could be followed by the particular aerial vehicle such that the particular aerial vehicle could avoid colliding with airborne objects in the airspace.

3. The process of claim 1, wherein the collision avoidance instructions comprise a flight instruction, wherein the flight instruction describes a maneuver that could be executed by the particular aerial vehicle such that the particular aerial vehicle could avoid colliding with airborne objects in the airspace.

4. The process of claim 1, further comprising:
   determining that the particular aerial vehicle is at risk of a collision;
   wherein the transmitting of the one or more collision avoidance instructions is responsive to the determination that the particular aerial vehicle is at risk of collision.

5. The process of claim 1, wherein a subscription status of the subscriber entity of the list of subscriber entities that is associated with the particular aerial vehicle is altered if two conditions are met, wherein the first condition of the two conditions comprises the received location data associated with the particular aerial vehicle corresponding to a location within the airspace, wherein the second condition of the two conditions comprises the received location data associated with the particular aerial vehicle not corresponding to a determined location of an airborne object in the airspace.

6. A process comprising:
   receiving, from at least one radar installation, data from 3-D radar scans of an airspace;
   analyzing the data from the 3-D radar scans to determine collision avoidance data for the airspace;
   receiving location data associated with a subscriber entity, wherein the location data indicates a respective location of each of one or more aerial vehicles that are associated with the subscriber entity;
   filtering the determined collision avoidance data based on the location data associated with the subscriber entity; and
   transmitting the filtered data to facilitate collision avoidance by the one or more aerial vehicles associated with the subscriber entity.

7. The process of claim 6, wherein filtering the determined collision avoidance data comprises substantially removing determined collision avoidance data corresponding to regions of the airspace not proximate to the indicated respective location of each of the one or more aerial vehicles.

8. The process of claim 6, wherein the determined collision avoidance data comprise position and trajectory data corresponding to airborne objects in the airspace.

9. The process of claim 8, wherein the transmitted filtered data comprises a description of a set of volumes in the airspace, wherein each volume in the set of volumes contains one or more locations corresponding to a determined location of one or more obstacles in the airspace.

10. The process of claim 8, wherein the transmitted filtered data comprises at least the determined position and trajectory data corresponding to airborne objects in the airspace proximate to the indicated respective location of each of the one or more aerial vehicles, wherein the subscriber entity comprises a first subscriber entity, and further comprising:
   receiving location data associated with a plurality of subscriber entities, wherein the location data indicates a respective location of each of one or more aerial vehicles that are associated with the plurality of subscriber entities;

transmitting information based on the determined collision avoidance data to facilitate collision avoidance by the one or more aerial vehicles associated with the plurality of subscriber entities;

and wherein the filtered data transmitted to facilitate collision avoidance by the one or more aerial vehicles associated with the first subscriber entity comprises an indication of which, if any, of the airborne objects corresponding to the transmitted determined location and trajectory data correspond to any of the one or more aerial vehicles associated with the plurality of subscriber entities.

11. The process of claim 8, wherein a subscription status of the subscriber entity is altered if two conditions are met, wherein the first condition of the two conditions comprises the received location data associated with the subscriber entity corresponding to a location within the airspace, wherein the second condition of the two conditions comprises the location within the airspace corresponding to the received location data associated with the subscriber entity not substantially corresponding to a determined position of an airborne object in the airspace.

12. The process of claim 6, further comprising:
maintaining a subscriber privilege database, wherein the subscriber privilege database comprises a list of subscriber entities, wherein the list of subscriber entities comprises an entry corresponding to the subscriber entity, wherein the subscriber privilege database further comprises a description of the type of information that may be accessed by individual subscriber entities in the list of subscriber entities;
wherein filtering the determined radar data is based on a description of the type of information that may be accessed by the subscriber entity, wherein the description of the type of information that may be accessed by the subscriber entity is part of the subscriber privilege database.

13. A system comprising:
a radar system communication interface;
an aerial vehicle communication interface; and
a controller operably coupled to the radar system communication interface and the aerial vehicle communication interface, wherein the controller is configured to:
receive, using the radar system communication interface, data from 3-D radar scans of an airspace;
analyze the data from the 3-D radar scans to determine collision avoidance data corresponding to airborne objects in the airspace, wherein the determined collision avoidance data comprise determined locations of airborne objects in the airspace;
receive, using the aerial vehicle communication interface, location data associated with a particular aerial vehicle;
determine, based on the collision avoidance data and the location data, one or more collision avoidance instructions for the particular aerial vehicle; and
transmit, using the aerial vehicle communication interface, the one or more collision avoidance instructions to facilitate operation of the particular aerial vehicle.

14. The system of claim 13:
wherein the controller is further configured to: receive, using the aerial vehicle communication interface, trajectory data associated with the particular aerial vehicle; and
wherein the collision avoidance instructions comprise instructions to follow one of one or more safe paths, wherein the one or more safe paths are determined based at least on the received location and trajectory data associated with the particular aerial vehicle and the determined collision avoidance data, wherein the one or more safe paths define paths that could be followed by the particular aerial vehicle such that the particular aerial vehicle could avoid colliding with airborne objects in the airspace.

15. The system of claim 13, wherein the collision avoidance instructions comprise a flight instruction, wherein the flight instruction describes a maneuver that could be executed by the particular aerial vehicle such that the particular aerial vehicle could avoid colliding with airborne objects in the airspace.

16. The system of claim 13, wherein the controller is further configured to:
receive, using the aerial vehicle communication interface, information from a plurality of aerial vehicles, wherein the received information comprises location information corresponding to respective aerial vehicles in the plurality of aerial vehicles, wherein at least one aerial vehicle in the plurality of aerial vehicles is located in the airspace; and
update an algorithm based on the received information from the plurality of aerial vehicles, wherein analyzing the data from the 3-D radar scans to determine collision avoidance data corresponding to airborne objects in the airspace comprises applying the algorithm to the data from the 3-D radar scans to calculate the determined locations of airborne objects in the airspace, and wherein updating the algorithm comprises altering the algorithm such that calculated locations of airborne objects in the airspace calculated using the algorithm after updating the algorithm are more accurate than calculated locations of airborne objects in the airspace calculated using the algorithm before updating the algorithm.

17. The system of claim 13, wherein the controller is further configured to:
maintain a list of subscriber entities authorized to receive collision avoidance data; and
determine that the particular aerial vehicle is associated with a subscriber from the list of subscriber entities, wherein the controller transmitting, using the aerial vehicle communication interface, the one or more collision avoidance instructions to facilitate operation of the particular aerial vehicle is performed responsive to the determination that the particular aerial vehicle is associated with the subscriber entity from the list of subscriber entities.

18. A system comprising:
a radar system communication interface;
an aerial vehicle communication interface; and
a controller operably coupled to the radar system communication interface and the aerial vehicle communication interface, wherein the controller is configured to:
receive, using the radar system communication interface, data from 3-D radar scans of an airspace;
analyze the data from the 3-D radar scans to determine collision avoidance data for the airspace;
receive, using the aerial vehicle communication interface, location data associated with a subscriber entity, wherein the location data indicates a respective location of each of one or more aerial vehicles that are associated with the subscriber entity;
filter the determined collision avoidance data based on the location data associated with the subscriber entity; and transmit, using the aerial vehicle communication interface, the filtered data to facilitate collision avoidance by the one or more aerial vehicles associated with the subscriber entity.

19. The system of claim 18, wherein filtering the determined collision avoidance data comprises substantially removing determined collision avoidance data corresponding to regions of the airspace not proximate to the indicated respective location of each of the one or more aerial vehicles.

20. The system of claim 18, wherein the determined collision avoidance data comprise position and trajectory data corresponding to airborne objects in the airspace.

21. The system of claim 20, wherein the filtered data transmitted to the subscriber entity comprises a description of a set of volumes in the airspace, wherein each volume in the set of volumes contains one or more locations corresponding to a determined location of one or more obstacles in the airspace.

22. The system of claim 20:
wherein the filtered data transmitted to the subscriber entity comprises at least the determined position and trajectory data corresponding to airborne objects in the airspace proximate to the indicated respective location of each of the one or more aerial vehicles
wherein the subscriber entity comprises a first subscriber entity;
wherein the controller is further configured to:
receive, using the aerial vehicle communication interface, location data associated with a plurality of subscriber entities, wherein the location data indicates a respective location of each of one or more aerial vehicles that are associated with the plurality of subscriber entities; and
transmit, using the aerial vehicle communication interface, information based on the determined collision avoidance data to the plurality of subscriber entities to facilitate collision avoidance by the one or more aerial vehicles associated with the plurality of subscriber entities; and
wherein the filtered data transmitted to the first subscriber further comprises an indication of which, if any, of the airborne objects corresponding to the transmitted determined location and trajectory data correspond to any of the one or more aerial vehicles associated with the plurality of subscriber entities.

23. The system of claim 20, wherein the controller is further configured to:
receive, using the aerial vehicle communication interface, information from a plurality of aerial vehicles, wherein the received information comprises location information corresponding to respective aerial vehicles in the plurality of aerial vehicles, wherein at least one aerial vehicle in the plurality of aerial vehicles is located in the airspace; and
update an algorithm based on the received information from the plurality of aerial vehicles, wherein determining collision avoidance data for the airspace comprises applying the algorithm to the data from the 3-D radar scans to calculate the position and trajectory data corresponding to airborne objects in the airspace, and wherein updating the algorithm comprises altering the algorithm such that calculated position and trajectory data corresponding to airborne objects in the airspace calculated using the algorithm after updating the algorithm are more accurate than calculated position and trajectory data corresponding to airborne objects in the airspace calculated using the algorithm before updating the algorithm.

24. The system of claim 18:
wherein the controller is further configured to maintain a subscriber privilege database, wherein the subscriber privilege database comprises a list of subscriber entities, wherein the list of subscriber entities comprises an entry corresponding to the subscriber entity, wherein the subscriber privilege database further comprises a description of the type of information that may be accessed by individual subscriber entities in the list of subscriber entities; and
wherein filtering the determined radar data is based on a description of the type of information that may be accessed by the subscriber entity, wherein the description of the type of information that may be accessed by the subscriber entity is part of the subscriber privilege database.

25. A process comprising:
receiving data about an airspace;
analyzing the data about the airspace to determine collision avoidance data for the airspace;
receiving a transmission from one or more aerial vehicles, wherein the one or more aerial vehicles are associated with a subscriber entity, wherein the received transmission comprises an indication of location data associated with the subscriber entity, wherein the location data indicates a respective location of each of the one or more aerial vehicles that are associated with the subscriber entity;
filtering the determined collision avoidance data based on the location data associated with the subscriber entity; and
transmitting, to the one or more aerial vehicles, the filtered data to facilitate collision avoidance by the one or more aerial vehicles associated with the subscriber entity.

* * * * *